(12) United States Patent
Kane

(10) Patent No.: US 7,440,084 B2
(45) Date of Patent: Oct. 21, 2008

(54) MICROMECHANICAL AND RELATED LIDAR APPARATUS AND METHOD, AND FAST LIGHT-ROUTING COMPONENTS

(75) Inventor: David M. Kane, Rowley, MA (US)

(73) Assignee: Arete' Associates, Northridge, CA (US)

( * ) Notice: Subject to any disclaimer, the term of this patent is extended or adjusted under 35 U.S.C. 154(b) by 71 days.

(21) Appl. No.: 11/015,285

(22) Filed: Dec. 16, 2004

(65) Prior Publication Data

US 2006/0132752 A1 Jun. 22, 2006

(51) Int. Cl.
*G01C 3/08* (2006.01)
(52) U.S. Cl. ....................................... 356/5.01
(58) Field of Classification Search ........ 356/5.01–5.15, 356/3.01–3.15, 4.01–4.1, 6–22
See application file for complete search history.

(56) References Cited

U.S. PATENT DOCUMENTS

| 5,477,350 | A * | 12/1995 | Riza et al. ................... 349/24 |
| 6,246,468 | B1 * | 6/2001 | Dimsdale ................... 356/4.02 |
| 6,370,422 | B1 * | 4/2002 | Richards-Kortum et al. 600/478 |
| 6,556,282 | B2 * | 4/2003 | Jamieson et al. ........... 356/4.01 |
| 6,836,285 | B1 * | 12/2004 | Lubard et al. ................. 348/31 |
| 2004/0031906 | A1 * | 2/2004 | Glecker ................... 250/208.1 |

OTHER PUBLICATIONS

Youngchul Chung, Ralph Spickermann, D. Bruce Young, and Nadir Dagil A Low-Loss Beam Splitter with an Optimized Waveguide Structure, 1992, IEEE Photonics Technology Letters, vol. 4, No. 9, Sep. 1992.*

* cited by examiner

*Primary Examiner*—Thomas H. Tarcza
*Assistant Examiner*—Luke D Ratcliffe
(74) *Attorney, Agent, or Firm*—Peter I. Lippman

(57) ABSTRACT

Several systems and a method are taught for rapid modulation of a light beam in lidar and other imaging. Most of these involve micromechanical and other very small control components. One such unit is a light-switching fabric, based on displacement of liquid in a tube that crosses a junction of two optical waveguides. In some forms, the fabric is preferably flexible to enable folding or coiling to form a two-dimensional face that interacts with optical-fiber ends an opposed fiber bundle. The rapid operation of the switch fabric enables it to be used as a beam-splitter, separating incoming and return beams; and also to form pulses from supplied CW light. Other control components include micromechanical mirrors (e. g. MEMS mirrors) operated in arrays or singly, liquid-crystal devices, and other controlled-birefringence cells. Some of these devices are placed within an optical system for directional light-beam steering.

6 Claims, 23 Drawing Sheets

MASK DESIGN

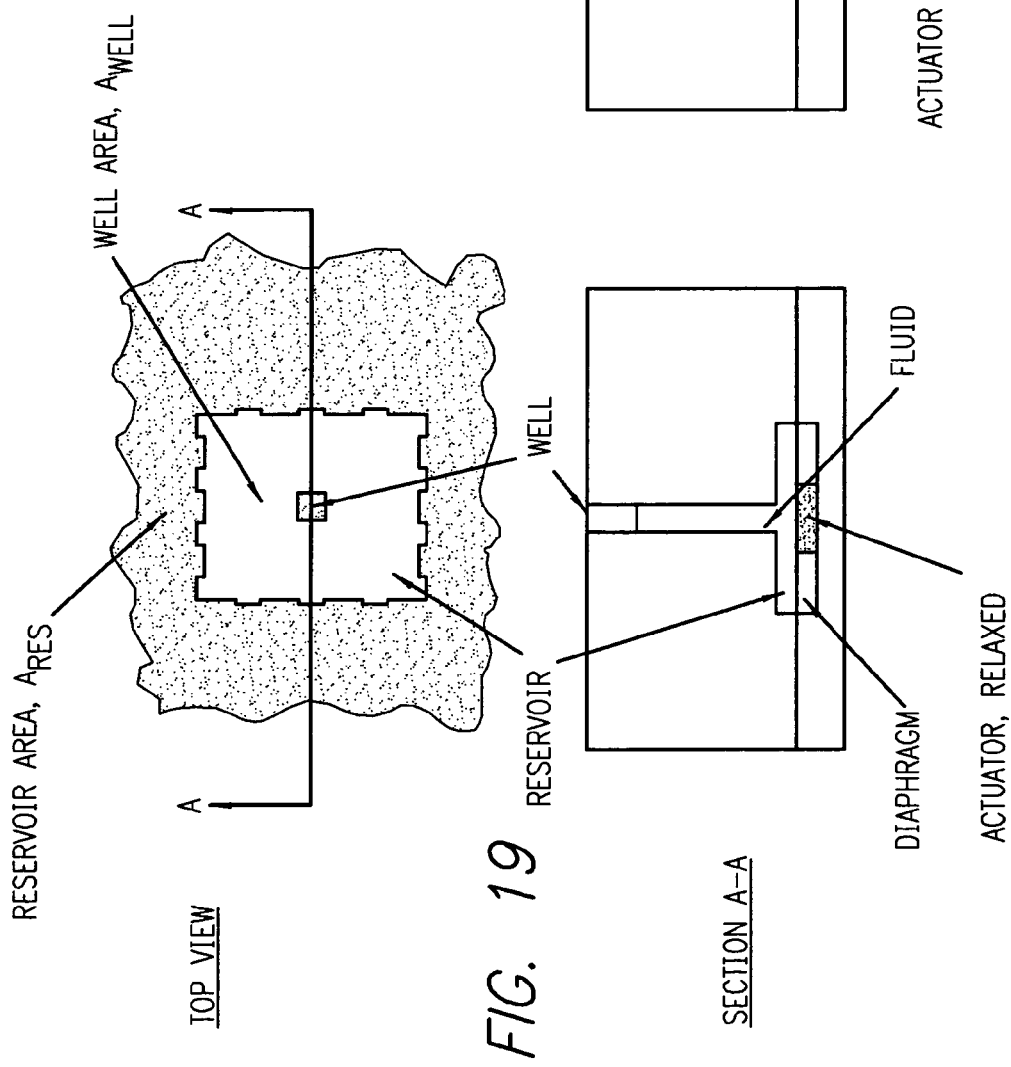
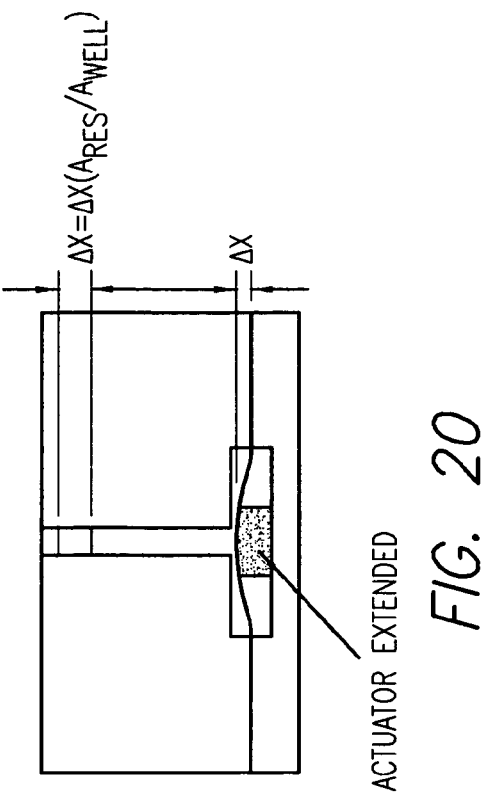
FIG. 19
FIG. 20

CHANNEL
CHANNEL, B
CHANNEL, K
CHANNEL, B
CHANNEL, K

AGENT EXPELLED FROM
INTERACTION REGION OF WELL

MICRO-PUMP CAPABLE OF
kHz OPERATION:
ACTUATOR EXTENDED
ACTUATOR CONTRACTED

AGENT DRAWN INTO
INTERACTION REGION OF WELL

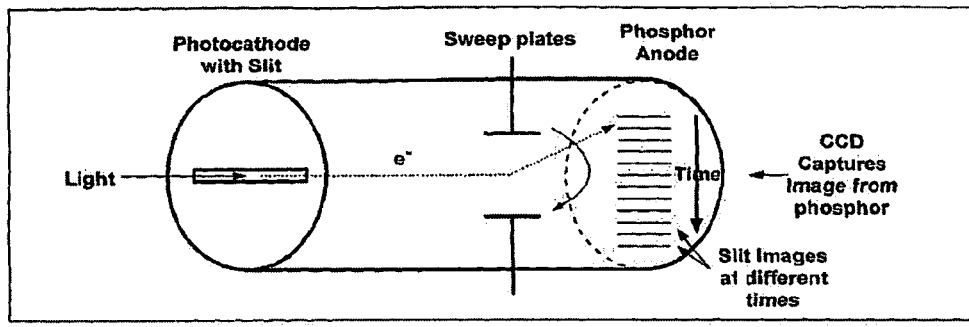
Fig. 25
after Gleckler
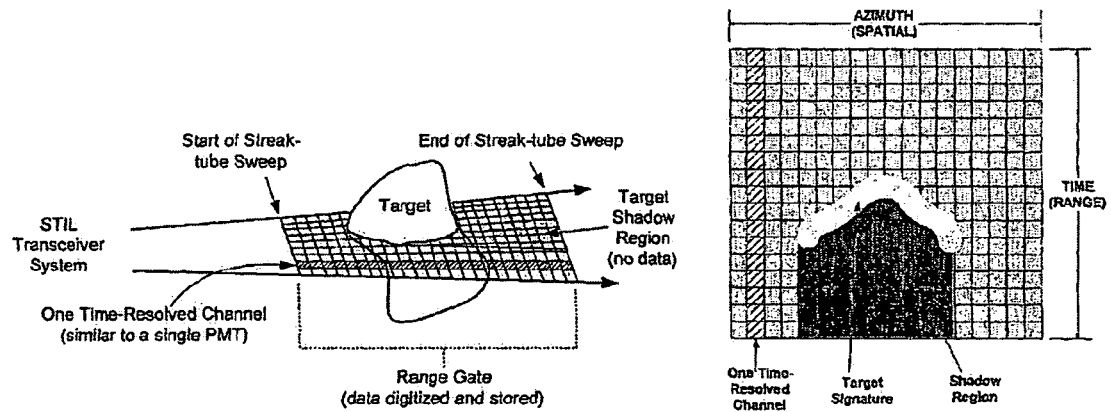
Fig. 26(a)
after Gleckler
Fig. 26(b)
after Gleckler after Griffis

US 7,440,084 B2

MICROMECHANICAL AND RELATED LIDAR APPARATUS AND METHOD, AND FAST LIGHT-ROUTING COMPONENTS

RELATION BACK

This document claims priority of U.S. provisional patent application Ser. No. 60/381,286, filed May 17, 2002, and International patent application PCT/US03/16062—both wholly incorporated by reference into this document.

OTHER RELATED DOCUMENTS

Closely related documents are other, coowned U.S. utility-patent documents and references—also incorporated by reference. Those documents are in the names of:

Bowker et al., application Ser. No. 09/125,259, "CONFOCAL-REFLECTION STREAK LIDAR APPARATUS WITH STRIP-SHAPED PHOTOCATHODE, FOR APPLICATIONS AT A WIDE RANGE OF SCALES";

Lubard et al., application Ser. No. 09/390,487, "LIDAR WITH STREAK-TUBE IMAGING, INCLUDING HAZARD DETECTION IN MARINE APPLICATIONS; RELATED OPTICS";

Kane et al., application Ser. No. 10/142,654 "HIGH-SPEED, LOW-POWER OPTICAL MODULATION APPARATUS AND METHOD";

Gleckler, application Ser. No. 10/258,917—published Nov. 1, 2001 as WO 01/81949, "VERY FAST TIME RESOLVED IMAGING IN MULTIPARAMETER MEASUREMENT SPACE";

Griffis et al., application Ser. No. 10/426,907, "COMPACT ECONOMICAL LIDAR SYSTEM"; and Bowker et al. U.S. Pat. No. 5,467,122, "UNDERWATER IMAGING SYSTEM".

FIGS. 1 and 2 of the Gleckler international ("WO") application and FIG. 1 of the Griffis application have been explicitly copied into the present document as FIGS. 25 through 27 respectively. Related text passages from those documents have likewise been copied into the present document, particularly in the Brief Description of Drawings—and also in the text immediately preceding the claims of this document.

Additional related documents are technical articles and pamphlets including:

Philip J. Bos, "LIQUID CRYSTAL BASED OPTICAL PHASED ARRAY FOR STEERING LASERS", Kent State University, Presentation Materials;

Brooker, Graham et al., "MILLIMETRE WAVES FOR ROBOTICS" *Proc.* 2001 *Australian Conference on Robotics and Automation*, (Sydney; 14-15 Nov. 2001); and Bruce Winker, "LIQUID CRYSTAL AGILE BEAM STEERING", Rockwell Science Center (Thousand Oaks, Calif.; Aug. 8, 2000).

BACKGROUND

1. Field of the Invention

This invention relates generally to micromechanical and related modulation of optical circuits and networks; and more particularly to methods and apparatus for providing faster switching or modulation with lower power than heretofore required for imaging.

2. Related Art

A seminal effort in this field is U.S. Pat. No. 4,988,157 of Jackel—assigned to Bell Communication. That patent teaches use of a chemically (to be more specific, electrolytically) creatable and destroyable bubble, and its implications on total internal reflection, for optical modulation.

U.S. Pat. Nos. 5,699,462 and 5,960,131 of Fouquet et al., and U.S. Pat. No. 5,978,527 of Donald, represent applications of the thermal-inkjet technology refinements of Hewlett Packard Company to light modulation or switching. Though faster than electrolysis, thermal effects operate on the order of milliseconds and accordingly are far from optimal in switching speed.

U.S. Pat. No. 5,619,600 of Pohl and U.S. Pat. No. 5,774,252 of Lin et al. represent entries in somewhat related fields on behalf of IBM and Texas Instruments, respectively; and Japanese publication 5-49055 of 1993 teaches a related effort by Nippon Telegraph & Telephone Corporation. Pohl teaches tunneling of light through liquid metal, for pathlengths on the order of a fractional wavelength; while possibly useful for kilohertz CW modulation, this technique too is relatively slow for switching.

Many or most lidar and related imaging systems are bulky and heavy, and require relatively high operating power—leading to operational inconvenience and expense. Curiously enough, one reason for these undesirable characteristics is the bulk and weight associated with apertures used in transmitting and then receiving optical signals.

Although philosophically speaking an aperture is in essence no more than a hole, in actual practice the hardware (including lenses and the like when present) typically associated with an aperture is bulky and heavy. Heretofore it has not been taught how to mitigate this problem in the lidar field.

A related persistent problem in known lidar systems is maintenance of good signal separation as between different parts of an object region of interest. The Bowker patent mentioned above, for example, projects a fan-shaped pulse beam to a wide-cross-track region of the ocean surface (and interior)—and receives reflection back from the entire region.

To the extent that some element of the beam is reflected laterally within the turbid ocean volume and returns from a different point than its impingement point, this system is subject to crosstalk. The patented teachings offer no correction for this phenomenon.

Other drawbacks commonly encountered are issues concerning field of view, speed and maneuverability of the system. Many of these systems are limited to a relatively small field of view and so require the use of multiple complete systems or repeated imaging from several positions.

The field of regard for many conventional optical systems is increased by an external scan mirror that allows the system to address a field that is larger than their field of view. This is done by rotating the external mirror relative to the optics (FIG. 10). Equivalently the entire optical system is sometimes mounted within a gimbal to rotate the entire optical system (FIG. 11).

Other systems, analogously, are further limited by the visual field that can be surveyed at any one instant in time because of components that must operate in sequence rather than independently. These drawbacks increase the importance of having a compact, maneuverable system capable of high-speed imaging that doesn't require multiple setups.

In addressing these shortcomings, it is also important to use alternatives that are based on broadly established and available parts and technologies. Economical concerns favor the use of such parts, especially if they can be reproduced in high volumes and offer the possibility of inexpensive rapid start-up of commercial exploitation.

While some conventional systems may address some of these shortcomings individually, what is needed is a versatile system that is both maneuverable, economical, and capable of being adapted to a wide variety of applications involving detecting, ranging and imaging in different environments. This adaptability should not be limited to use in different applications, but should also allow the flexibility to choose instrumentation and light sources depending on one's needs and preferences for a given project.

Another economic factor of concern includes power requirements for driving any attached light sources. Still another is the circuitry necessary to satisfy these power requirements.

As can now be seen, the related art remains subject to significant problems. The efforts outlined above—although praise-worthy—leave room for considerable refinement.

SUMMARY OF THE DISCLOSURE

The present invention introduces such refinement. The invention has several major facets or aspects, which can be used independently—although, to best optimize enjoyment of their advantages, certain of these aspects or facets are best practiced (and most-preferably practiced) in conjunction together.

In preferred embodiments of its first major independent facet or aspect, the invention is a system for use with one or more features to be detected and ranged. (That is to say, the features are not themselves part of the invention but rather are part of the operating environment of context of the invention.)

This system includes a source for generating a lidar beam; and also at least one transceiver for directing the beam to—and collecting light reflected from—the one or more features. Also included are a lidar detector for time-resolving the reflected beam; and a beam splitter for passing light from the source to the transceiver, and from the transceiver to the detector.

The foregoing may represent a description or definition of the first aspect or facet of the invention in its broadest or most general form. Even as couched in these broad terms, however, it can be seen that this facet of the invention importantly advances the art.

In particular, building a lidar system with a beam splitter for routing the light to and from the transceiver introduces the capability of sharing an aperture, as between transmitting and receiving optics. This allows use of a given apparatus mass and bulk to service both optical subsystems and thereby implies availability of a single, large aperture—both for high projected illumination levels and for high detection sensitivity and ranging accuracy.

Although the first major aspect of the invention thus significantly advances the art, nevertheless to optimize enjoyment of its benefits preferably the invention is practiced in conjunction with certain additional features or characteristics. In particular, preferably the beam splitter is configured so that—in passing light bidirectionally to and from a particular point of the one or more features—the splitter passes light through substantially a single corresponding common point of a corresponding transceiver.

Another preference is that in operation the splitter pass light through substantially a single corresponding common point of the splitter itself. Yet another preference is that the beam splitter be a fractionally-transmitting optical element—and in this case further preferably the splitter is a substantially passive optical element. Still another preference, alternative to the passive form just stated, is that the splitter be actively switched to route (1) the generated beam from the source, but (2) the reflected beam to the detector.

In preferred embodiments of its second major independent facet or aspect, again the invention is a system for use with one or more features to be detected and ranged—and includes a lidar-beam source. It also includes at least one transceiver for directing the beam to, and collecting light reflected from, the one or more features.

This system also includes a lidar detector for time-resolving the reflected beam. In passing light bidirectionally to and from a particular point of the one or more features, the transceiver passes light through substantially a single corresponding common point of the transceiver.

The foregoing may represent a description or definition of the second aspect or facet of the invention in its broadest or most general form. Even as couched in these broad terms, however, it can be seen that this facet of the invention importantly advances the art.

In particular, the described lidar system establishes conjugate points in the object field, where the physical features of interest reside, and in the transceiver. In other words, a point is established in the object field that corresponds with a point in the transceiver—and multiple such one-to-one correspondences are established, for multiple points of the object and transceiver respectively. Such conjugate relationships in routing the light from and back to the transceiver afford a much higher degree of precision and accuracy than heretofore possible, in identifying or localizing the features that are detected and ranged.

Although the second major aspect of the invention thus significantly advances the art, nevertheless to optimize enjoyment of its benefits preferably the invention is practiced in conjunction with certain additional features or characteristics. In particular, preferably the transceiver includes a fiber-optic element and free-space imaging optics; and it is the imaging optics that establish conjugate points of the one or more features, for substantially each fiber of the fiber-optic element.

In preferred embodiments of its third major independent facet or aspect, the invention is a system for use with one or more features to be detected and ranged. This system includes a lidar light-beam source; and also at least one transceiver for directing a lidar beam from the source to, and collecting the beam reflected from, the one or more features.

The system also includes a lidar detector for time-resolving the reflected beam. Also included are some means for steering successive time segments of the beam to and from particular points, selectively, of the one or more features.

These means, for purposes of generality and breadth of discussion, may be called simply the "steering means". These steering means include several possible choices: at least one micromechanical mirror, or optical-switching fabric, or liquid-crystal display, or device having signal-controlled birefringence, or other type of device employing nonlinear optical material. For purposes of this document, the term "micromechanical" encompasses microscopic-scale mechanical elements that are powered or actuated, or both, electrically or electronically—but also elements powered or actuated optically, or biologically, or thermally, or by other sorts of signals or energy flows including such phenomena that are not yet commercially implemented now.

The foregoing may represent a description or definition of the third aspect or facet of the invention in its broadest or most-general form. Even as couched in these broad terms, however, it can be seen that this facet of the invention importantly advances the art.

In particular, use of these kinds of devices for selecting particular portions of objects and features of interest enables the system to cover a very broad visual field with a single lidar source-and-detector system, at high speeds and while retaining full precision and accuracy of identifying and localizing details in the scene.

Although the third major aspect of the invention thus significantly advances the art, nevertheless to optimize enjoyment of its benefits preferably the invention is practiced in conjunction with certain additional features or characteristics. In particular, preferably the at least one transceiver includes plural transceivers, and the steering means include means for successively selecting different ones of the transceivers. Another preference is that the steering means include means for successively selecting different particular points addressed through a transceiver; these two preferences are mutually compatible, and capable of being practiced together.

In preferred embodiments of its fourth independent aspect, the invention is a system for use with features to be detected and ranged. Thus as before the features themselves are not part of the invention but rather represent its operating environment, or context.

The system includes a lidar light-beam source, and plural transceivers—each for directing a lidar beam from the source to, and collecting light reflected from, a particular one or more of the features respectively. The system of this fourth facet of the invention also includes a lidar detector for time-resolving the reflected beam; and some means for steering successive time segments of the beam to and from particular ones, selectively, of the plural transceivers respectively.

The foregoing may represent a description or definition of the fourth aspect or facet of the invention in its broadest or most general form. Even as couched in these broad terms, however, it can be seen that this facet of the invention importantly advances the art.

In particular, this fourth facet of the invention extends the above-stated benefits of the third aspect even further, to the case of plural transceivers. Such transceivers can readily cover not only an entire full three-dimensional field of view (i. e., 4π steradians) from a particular point in space, but also—through specialized routing of e. g. optic-fiber bundles in the transceivers—simultaneous monitoring of supplementary special views within enclosures, or through spectrometric evaluation systems, and so forth.

Although the fourth major aspect of the invention thus significantly advances the art, nevertheless to optimize enjoyment of its benefits preferably the invention is practiced in conjunction with certain additional features or characteristics. In particular, preferably the steering means include some means for successively selecting different particular points addressed through a transceiver.

In preferred embodiments of its fifth major independent facet or aspect, again the invention is a system for use with one or more features to be detected and ranged. This system includes a lidar light-beam source.

It also includes at least one transceiver for directing a lidar beam from the source to, and collecting the beam reflected from, the one or more features; and a lidar detector for time-resolving the reflected beam. This system also includes one or more micromechanical devices for routing the beam.

For purposes of this document, "micromechanical devices" include microelectromechanical systems (MEMS) such as the units sold by the Texas Instruments Company under that name. Such devices also, however, include essentially microscopic-scale devices that are not actuated, controlled or powered electrically or electronically.

In this regard it is known that very small systems can be powered, controlled and actuated by optical signals instead. The terminology "micromechanical devices" is likewise meant to encompass any other forms of input power and control, whether or not available commercially at the time of this writing. For example such forms may include thermal signals, or may include natural or artificial biological components (e. g. neurons) integrated into the system. Substantially the same observation appears above with respect to the third aspect of the invention.

The foregoing may represent a description or definition of the fifth aspect or facet of the invention in its broadest or most general form. Even as couched in these broad terms, however, it can be seen that this facet of the invention importantly advances the art.

In particular, this fifth facet of the invention—through use of micromechanical equipment in steering a lidar beam—provides a hitherto unattainable degree of speed and maneuverability in monitoring an extraordinarily broad viewing field. This use of components is also particularly beneficial in that such apparatus is very readily amenable to placement within (rather than outside) the optical system, according to certain other facets of the invention discussed in this document.

Although the fifth major aspect of the invention thus significantly advances the art, nevertheless to optimize enjoyment of its benefits preferably the invention is practiced in conjunction with certain additional features or characteristics. In particular, preferably the devices include an array of multiple micromechanical devices.

In one such basic preferable form, the devices include a fabric made up of an array of multiple micromechanical switches—each switch being generally such as set forth in the previously mentioned optical cross-connect patent document. In such a fabric, in turn, preferably the switches are regularly arrayed according to a coordinate system; and the system further includes a processor having some means for controlling the switches in common, in groupings by dimensions of the coordinate system.

If this last-mentioned preference is observed, then still further in turn as a subpreference the coordinate system is substantially rectangular; and the groupings of switches are substantially by row and column of the array. As an alternative subpreference the coordinate system is substantially closest-packing (i. e., in the classical sixty-degree geometries that allow circles or spheres to be fitted most closely together); and the switches be grouped substantially by linear sequence within the closest-packing array.

Yet another subpreference option is that the coordinate system be substantially polar or spiral; and the switches be grouped substantially by polar coordinates or spiral raster within the array. As will be seen, these geometries are particularly easy to achieve with a fabric-form switching medium—especially if the fabric can be arranged or deformed in three dimensions.

In an alternative basic preference, rather than a switching fabric the array includes multiple mirrors; and further includes a processor having means for controlling mechanical manipulation of the mirrors. If this preference is adopted, then it is further preferable that the mirrors be regularly arrayed according to a coordinate system; and that the processor include some means for controlling the mirrors in common, in groupings by dimensions of the coordinate system.

In this latter case then again several options for implementing the preference are available: an essentially rectangular system, with mirrors grouped substantially by row and column; or closest-packing, with grouping by linear sequence; or a polar or spiral coordinate system, with corresponding grouping of the mirrors. In the rectangular case, it is particularly advantageous that the processor include some means for controlling the mirrors to provide a ripple-propagating row or column corresponding to features of the at least one transceiver.

Another alternative basic preference is that the one or more mechanical devices include at least one mirror successively angled to select particular linear groups of features of the at least one transceiver. In this case it is further preferable that the at least one mirror be successively angled about an axis defined along substantially a single direction.

Yet another basic alternative is that the one or more mechanical devices preferably include at least one mirror successively angled to select individual pixels or pixel groups of the at least one transceiver. In this case preferably the at least one mirror is successively angled about plural axes defined along corresponding plural directions.

In preferred embodiments of its sixth major independent facet or aspect, the invention is a system for use with one or more features to be detected and ranged. The system includes a lidar light-beam source; and at least one transceiver for directing a lidar beam from the source to, and collecting the beam reflected from, the one or more features. Also included are a lidar detector for time-resolving the reflected beam; and one or more liquid-crystal devices for routing the beam.

The foregoing may represent a description or definition of the sixth aspect or facet of the invention in its broadest or most general form. Even as couched in these broad terms, however, it can be seen that this facet of the invention importantly advances the art.

In particular, the combination with liquid-crystal devices—while not micromechanical in nature per se—partakes of some of the same characteristics as the combination with micromechanical devices recited for the fifth facet above; and accordingly confers certain of the same benefits. Design and manufacturing capability for liquid-crystal devices, however, already is very broadly established and available on an extremely economical basis—as well as in high volumes. Hence liquid-crystal technology offers significant advantages for inexpensive rapid start-up of commercial exploitation, for this facet of the invention.

Although the sixth major aspect of the invention thus significantly advances the art, nevertheless to optimize enjoyment of its benefits preferably the invention is practiced in conjunction with certain additional features or characteristics. In particular, preferably the devices include an array of multiple liquid-crystal devices; and the system further includes a processor for controlling the devices. This facet of the invention is subject to generally the same preferences mentioned above for other steering or routing devices: array of the liquid-crystal devices according to a coordinate system; and control of those devices in common, in groupings by dimensions of the coordinate system. Here too, preferably the system is substantially rectangular, or closest-packing, or polar or spiral; and the devices are grouped to follow suit.

In preferred embodiments of its seventh major independent facet or aspect, the invention is a system for use with one or more features to be detected and ranged. The system includes a lidar light-beam source; at least one transceiver for directing a lidar beam from the source to, and collecting the beam reflected from, the one or more features; a lidar detector for time-resolving the reflected beam; and one or more controlled-birefringence or other nonlinear-optics devices for routing the beam.

The foregoing may represent a description or definition of the seventh aspect or facet of the invention in its broadest or most general form. Even as couched in these broad terms, however, it can be seen that this facet of the invention importantly advances the art.

In particular, as with liquid-crystal devices discussed above for the sixth facet of the invention, controlled-birefringence units offer advantages that are analogous to those of micromechanical devices. Some birefringence devices, however, like micromechanical mirrors also have the capability of controllable magnitude of deflection. Such angular control can be exploited to provide plural different directions of pointing per device (i.e., pointing control that is multilevel rather than binary), simply through variation of the control voltage or other signal.

Although the seventh major aspect of the invention thus significantly advances the art, nevertheless to optimize enjoyment of its benefits preferably the invention is practiced in conjunction with certain additional features or characteristics. In particular, some of the main preferences are as described above for liquid-crystal devices.

In preferred embodiments of its eighth major independent facet or aspect, the invention is a system for use with one or more features. (Again, the features are not part of the invention but rather of the environment in which the invention can operate.) The system includes a source for generating a light beam.

It also includes a fabric made up of micromechanical light switches. The fabric is for routing the light beam to the features selectively.

The foregoing may represent a description or definition of the eighth aspect or facet of the invention in its broadest or most general form. Even as couched in these broad terms, however, it can be seen that this facet of the invention importantly advances the art.

In particular the potential of this aspect of the invention sweeps more broadly than some of those discussed earlier, as this facet of the invention is not necessarily itself a lidar system or part of a lidar system. The general advantages of this aspect of the invention encompass extremely versatile capability for steering a light beam in myriad different applications. The switch fabric is a fundamental new tool of optics control that can be used in common microillumination, and pattern-modulated signaling; but also can be used as well in the most exotic imaginable high-technology systems that impose extremely stringent demands of complexity, of timing, of lightweight and compact configuration, and yet also of economy.

Although the eighth major aspect of the invention thus significantly advances the art, nevertheless to optimize enjoyment of its benefits preferably the invention is practiced in conjunction with certain additional features or characteristics. In particular, preferably the system also includes at least one transmitter for directing the beam to the one or more features; and the switch fabric directs light to particular portions of the transmitter.

Other basic preferences are that the system further include a processor for controlling the switches; that the fabric be arranged in three dimensions to provide groups of the switches aligned with the particular portions of the transmitter; and that the transmitter present an at-least-two-dimensional array of optical conductors corresponding with the switch groups. It is also preferred that the fabric be folded to provide plural planes of the switches—or coiled to provide plural layers of switches.

Yet another basic preference is that the transmitter include a transceiver for directing the beam to and from the one or more features, to collect reflected portions of the beam; and that the fabric direct light to and from said particular portions of the transmitter. If this preference is employed then a subpreference is that the system further include a detector receiving the reflected beam from the transmitter and fabric—with the fabric directing light (1) from the source and (2) to the detector, respectively.

All of the eight facets of the invention discussed to this point are capable of specialized applications. For example the beam can be pulsed, or continuous-wave but subjected to a modulation pattern—and in either case can be synchronously detected to enable time-resolving of light reflected or returned from features of interest.

The time-resolved light can also be interpreted to detect and range the features. An interpretive output signal can then be applied to image the features—or, in other types of systems, to avoid or meet, or otherwise navigate relative, to the one or more features. The control can for instance include a vehicle that has at least partly automatic navigation; or an advisory system for assisting a human operator in such complex operation.

In preferred embodiments of its ninth major independent facet or aspect, the invention is a system for use with input or output devices, or both, and with at least one light beam. In other words, as suggested for earlier-discussed aspects of the invention, the input and output devices and the light beam are not part of the invention itself—but rather form the environment of the invention.

The system includes a fabric made up of micromechanical light switches for routing the light beam selectively. The fabric is arrangeable in three dimensions to provide groups of the switches aligned with particular ones of the input or output devices, or both.

The foregoing may represent a description or definition of the ninth aspect or facet of the invention in its broadest or most general form. Even as couched in these broad terms, however, it can be seen that this facet of the invention importantly advances the art.

In particular, such three-dimensional arrangement of the fabric provides a unique kind, or quality, of input/output capability. The fabric is not limited to use in lidar systems, but rather is applicable to provide extremely complex subdivision and steering or switching of light beams separately provided, in innumerable different industrial applications.

Although the ninth major aspect of the invention thus significantly advances the art, nevertheless to optimize enjoyment of its benefits preferably the invention is practiced in conjunction with certain additional features or characteristics. In particular, preferably the fabric is arranged in three dimensions to align with particular the input or output devices, or both.

If that preference is observed, then further preferably the system—in combination with the input or output devices, or both—is such that the input or output devices, or both, present an at-least-two-dimensional array of optical conductors corresponding with the switch groups. A still-further nested preference in this case is that the groups of switches direct light to and from particular portions of the array.

Yet another basic preference is that the source be embedded within the fabric. Analogously it is preferable that a detector, too, be embedded within the fabric.

Another basic preference is that the fabric be foldable, or folded, to provide plural planes of the switches. Another is that it be coilable or coiled, to yield plural layers of switches.

In preferred embodiments of its tenth major independent facet or aspect, the invention is a system for use with light that is reflected, by a reflecting entity, from a source to a destination. Here once again the source, the light, the reflecting entity and the destination are not parts of the invention but simply its environment.

This system includes a bidirectional beam splitter made up of micromechanical light switches for routing the light beam selectively. The switches are switchable rapidly enough to establish at least two distinct routes that include:
  a route from the source to the reflecting entity, at a first time; and
  a route from the reflecting entity to the destination, at a second time.

In this system the switches are switchable rapidly enough to change routing between the first route and the second during a time interval between passage of the light from the source to the reflecting entity and return of the same reflected light from the reflecting entity.

The foregoing may represent a description or definition of the tenth aspect or facet of the invention in its broadest or most general form. Even as couched in these broad terms, however, it can be seen that this facet of the invention importantly advances the art.

In particular, this system includes an element called a "beam splitter" because it can be used in place of a conventional or classical half-silvered mirror, one that enables direction of a light beam into two different, separate paths from a single identical point along on an optical path. Such conventional devices thus share a light-beam and its path spatially—but the present system, although also causing divergence from a single identical point, instead shares the beam and the beam path temporally. In this sense it is generally analogous to a simple macroscopic chopper mirror, but switches the beam far more rapidly and controllably than possible heretofore.

Although the tenth major aspect of the invention thus significantly advances the art, nevertheless to optimize enjoyment of its benefits preferably the invention is practiced in conjunction with certain additional features or characteristics. In particular, preferably the system is for use with light that is a pulse beam or a modulated continuous-wave beam; and the pulse or a modulation signature, respectively, is of duration in one or more of these ranges:
  on the order of milliseconds, or longer;
  on the order of microseconds to hundreds of microseconds;
  on the order of nanoseconds to hundreds of nanoseconds; or
  on the order of picoseconds, or less, to hundreds of picoseconds.

Another preference is that the beam splitter have substantially no reflecting surface that loses more than a few percent of the light passing therethrough, along at least the first route. As will be understood, this preference plainly distinguishes a conventional beam-splitter that ordinarily loses forty to sixty percent of the light energy in either route.

In preferred embodiments of its eleventh major independent facet or aspect, the invention is an optical system for use with one or more features to be characterized by light reflected therefrom. The system includes a source for generating a light beam, and a detector receiving the reflected beam.

It also includes some means for directing the beam from the source to the one or more features and collecting the reflected beam from the one or more features. The system further includes a directional scanner for selectively pointing the directing means. The scanner is disposed:
  preceding an exit pupil, for light passing from the directing means to the one or more features; or
  following a reentry pupil, for light from passing from the one or more features to the directing means; or
  both preceding an exit pupil and following an entry pupil.

The foregoing may represent a description or definition of the ninth aspect or facet of the invention in its broadest or most general form. Even as couched in these broad terms, however, it can be seen that this facet of the invention importantly advances the art.

In particular, such a scanning capability that is basically within the optical system enables turning of an exploratory light beam to characterize a very broad visual field, far more quickly and with far smaller, lighter and less powerful apparatus than the external mirrors and the apparatus gimbals of the prior art. This aspect of the invention makes such capability available not only for lidar systems but also for a great number of other kinds of applications.

Although the eleventh major aspect of the invention thus significantly advances the art, nevertheless to optimize enjoyment of its benefits preferably the invention is practiced in conjunction with certain additional features or characteristics. In particular, preferably the system is a lidar system, and the source generates a pulse beam or a modulated continuous-wave beam.

Furthermore preferably the directing means include at least one micromechanical device. In that case other preferences are that the micromechanical device be a steerable mirror, or a steerable array of mirrors; or an array of optical switches or three-dimensionally arranged array of such switches. Still other preferences are that the directing means include at least one liquid-crystal device, or at least one controlled-birefringence device or other nonlinear-optics device.

In preferred embodiments of its twelfth major independent facet or aspect, the invention is a method for concurrently producing light pulses and distributing the pulses to features, for use in detecting and ranging those features.

The method uses a light source, at least one light detector, and an array of micromechanical optical switches such as—merely by way of example—the fabric discussed above or the basic optical cross-connect grid introduced in the above-mentioned patent document of Kane et al. The method includes the step of operating the source to form a generally continuous light beam, and, during that operating step, passing the generally continuous light beam into the array of switches.

The method also includes the step of—during the passing step—setting the switches to direct the generally continuous beam toward a first one of the features. The method further includes the step of then resetting the switches to interrupt directing of the generally continuous beam toward the first one of the features.

In this way the setting and resetting steps cooperate to form a pulse of light directed toward the first one of the features. The resetting step also concurrently routes the pulse of light that is reflected from the first one of the features to the at least one detector. In addition the method includes the step of—concurrently with the resetting step—time-resolving the reflected light to detect and range the first one of the features.

Furthermore the method includes the step of then iterating the setting, resetting and time-resolving steps—but with respect to second and subsequent ones of the features. This iteration thus successively detects and ranges the second and subsequent ones of the features.

The foregoing may represent a description or definition of the twelfth aspect or facet of the invention in its broadest or most general form. Even as couched in these broad terms, however, it can be seen that this facet of the invention importantly advances the art.

In particular, this twelfth aspect of the invention basically time-shares much of the apparatus, enabling time-overlapped independent detection and ranging of features in different parts of the overall visual field. The overall field can thereby be surveyed in a fraction of the time needed by conventional methods.

Although the twelfth major aspect of the invention thus significantly advances the art, nevertheless to optimize enjoyment of its benefits preferably the invention is practiced in conjunction with certain additional features or characteristics. In particular, preferably the resetting step interrupts the directing step by instead directing the generally continuous beam toward the next one of the features in turn—substantially immediately, with substantially negligible intervening interval.

This way of practicing the twelfth facet of the invention represents a still-higher degree of time-overlap—or temporal shingling, so to speak. According to this preference the invention permits the detection and ranging of the second and some subsequent features to proceed while directing of pulses with respect to later features is already ongoing.

In some cases, however, this preference results in reflected pulses from different features passing through common fibers of the switch fabric at the same time, and this can represent unacceptable crosstalk. To avoid this condition, preferably the method utilizes multiple light detectors; and the iterating step routes subsequent reflected pulses of light to respective different ones of the multiple detectors.

All of the foregoing operational principles and advantages of the present invention will be more fully appreciated upon consideration of the following detailed description, with reference to the appended drawings, of which:

BRIEF DESCRIPTION OF THE DRAWINGS

FIG. 19 is a two-part diagram of a FASA unit used in preferred embodiments of the invention, the upper portion of the diagram being in plan, and the lower portion in elevational cross-section—and showing the actuator relaxed so that the liquid level is relatively low;

FIG. 20 is another elevational cross-section like the bottom part of FIG. 19, but with the actuator extended to push the diaphragm and thereby liquid upward, expelling some fluid from the reservoir into the well;

FIG. 25 is an elevation, highly schematic, of conventional streak-tube architecture (copied from FIG. 1 of the previously mentioned Gleckler patent document, incorporated herein by reference);

FIG. 26 is a pair of simplified diagrams showing (a) in perspective or isometric view, typical STIL data collection in a plane that extends away from the instrument through and beyond an object of interest; and (b) an elevation of a resulting CCD image for the same measurement setup (both copied from FIG. 2 of Gleckler)

DETAILED DESCRIPTION OF THE PREFERRED EMBODIMENTS

Applications

Figure 1:
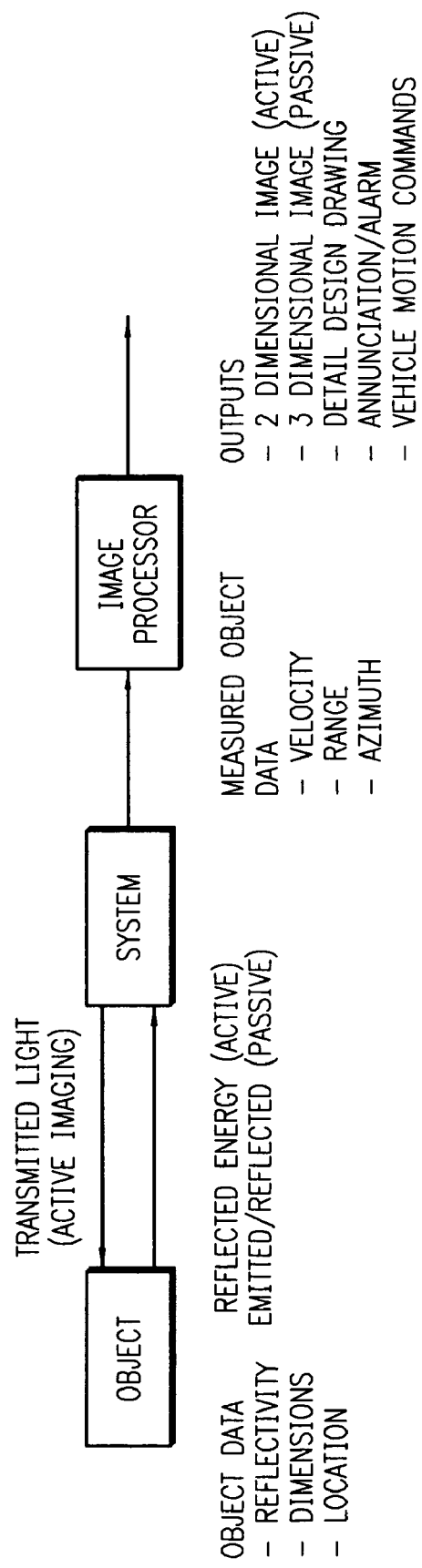
FIG. 1 is a block diagram representing an exemplary application of a preferred embodiment.

In particularly preferred applications and embodiments, the invention is used as an optical system, or as part of an optical system, for detection and ranging as well as imaging (FIG. 1). The imaging applications can be active or passive depending on the result desired.

In active imaging, a source is used to illuminate an object of interest. Passive imaging instead collects illumination emitted from the object, or reflected from the environment, to form an image of an object of interest.

These imaging applications are applied to many fields including but not limited to industrial automation, aerospace, industrial inspection, intelligence, and reverse engineering (i. e. regeneration of detailed engineering designs from already-built hardware) as well as guidance and control (FIG. 1). The last-mentioned field includes applications such as collision avoidance, object interception and vehicle rendezvous. In these applications, measured values for location and velocity of an object are used to calculate appropriate vehicle-motion commands. Manipulation of such calculations is known among persons of ordinary skill in this field.

System

Figure 3:
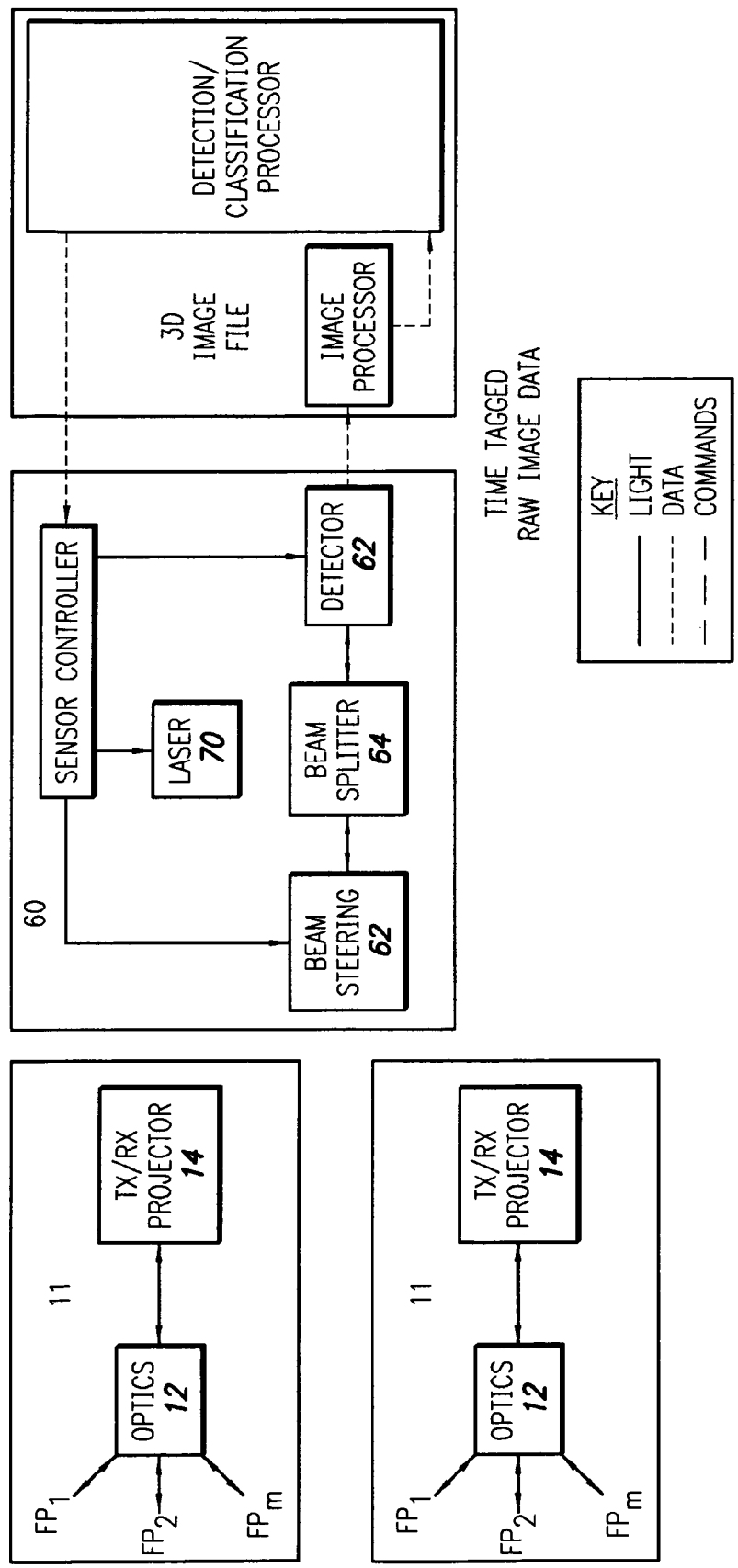
FIG. 3 is a block diagram of a preferred embodiment particularly showing its major assemblies.

In preferred embodiments of the system, main assemblies are a system assembly 50 (FIG. 3) and one or more transmitter/receiver (TX/RX) assemblies 11. The structure and components of these assemblies vary and can easily be adapted for specific applications or for use with existing equipment.

Additional components can be added to the system to further monitor or process the imaging data. For example, in preferred embodiments a spectrometer or photodiode spectrophotometer is added to collect additional imaging information for signals both inside and outside the visible spectrum and for creating data libraries based on these signals.

Moreover, one or more processors are added in preferred embodiments to coordinate imaging information or for automating responses to the information received. The automatic responses include an advisory or alarm system used to alert an operator or a command to perform additional automated or robotic responses such as operating a vehicle or other apparatus.

Transmit/Receive Assembly-

Figure 5:
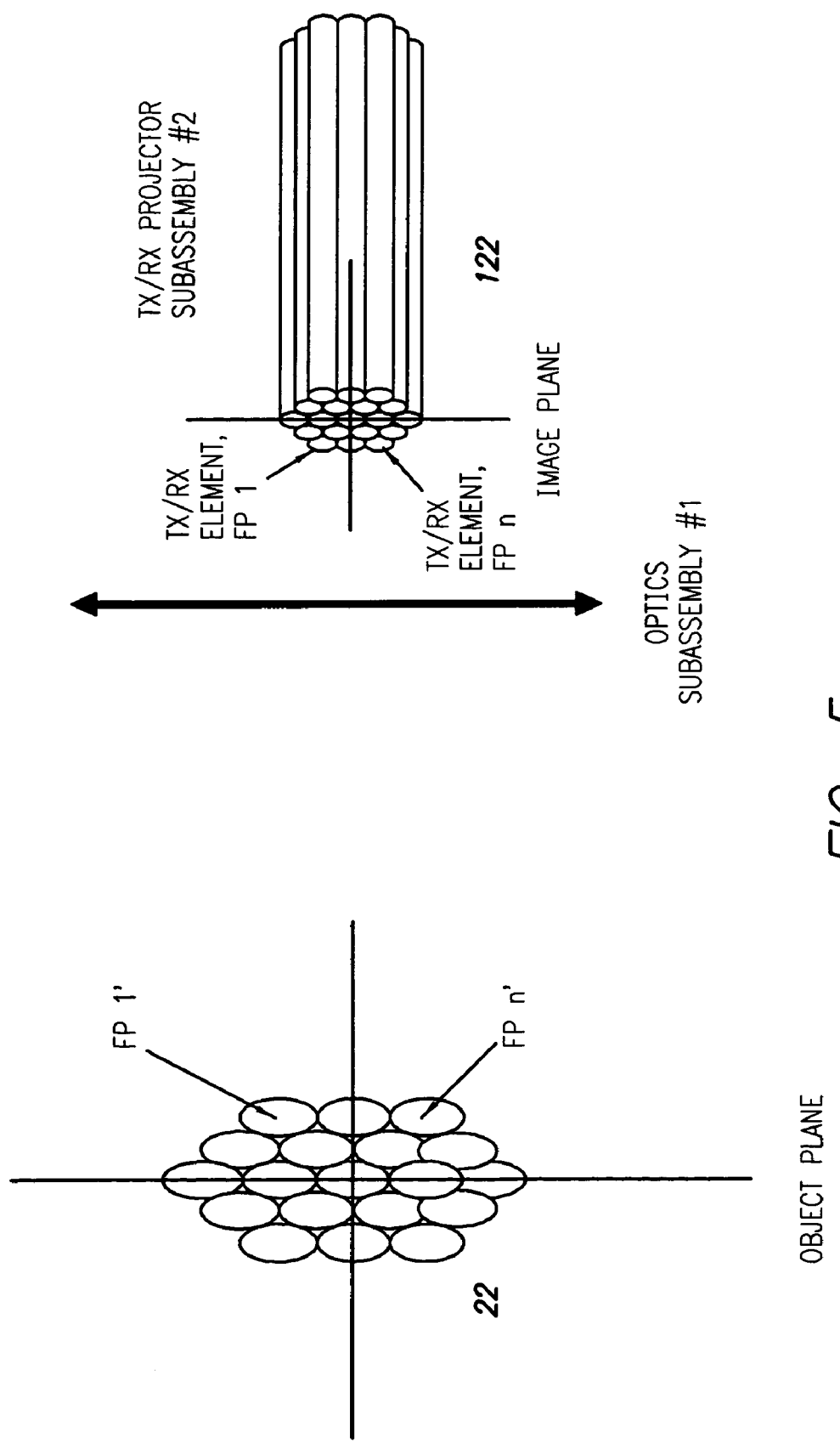
FIG. 5 is a conceptual diagram of a transmitter/receiver assembly that is one of the FIG. 3 major assemblies—showing a conjugate relationship between focal-plane elements (FP) in the object plane and in the image plane.

In a particularly preferred embodiment of the invention, the TX/RX assembly 11 includes projection optics 12 and a projector 14 located at the image plane 10 of the optics (FIG. 5). Use of fiber optics 16, in constructing the projector 14, provides the flexibility to remotely locate one or more of the assemblies in remote or hazardous locations or to uniformly distribute the fields of view of the individual assemblies to achieve an overall field that is a full hemisphere or even a sphere.

Because each assembly can stand alone, providing a narrow field of view, or can be replicated and grouped together (FIG. 3), the system can be customized to provide practically any particularly desired overall field of view 20. Thus, as noted just above, the assembly is not limited to the view from a single TX/RX unit; instead it can provide $2\pi$- or even a $4\pi$-steradian field of view.

Figure 4:
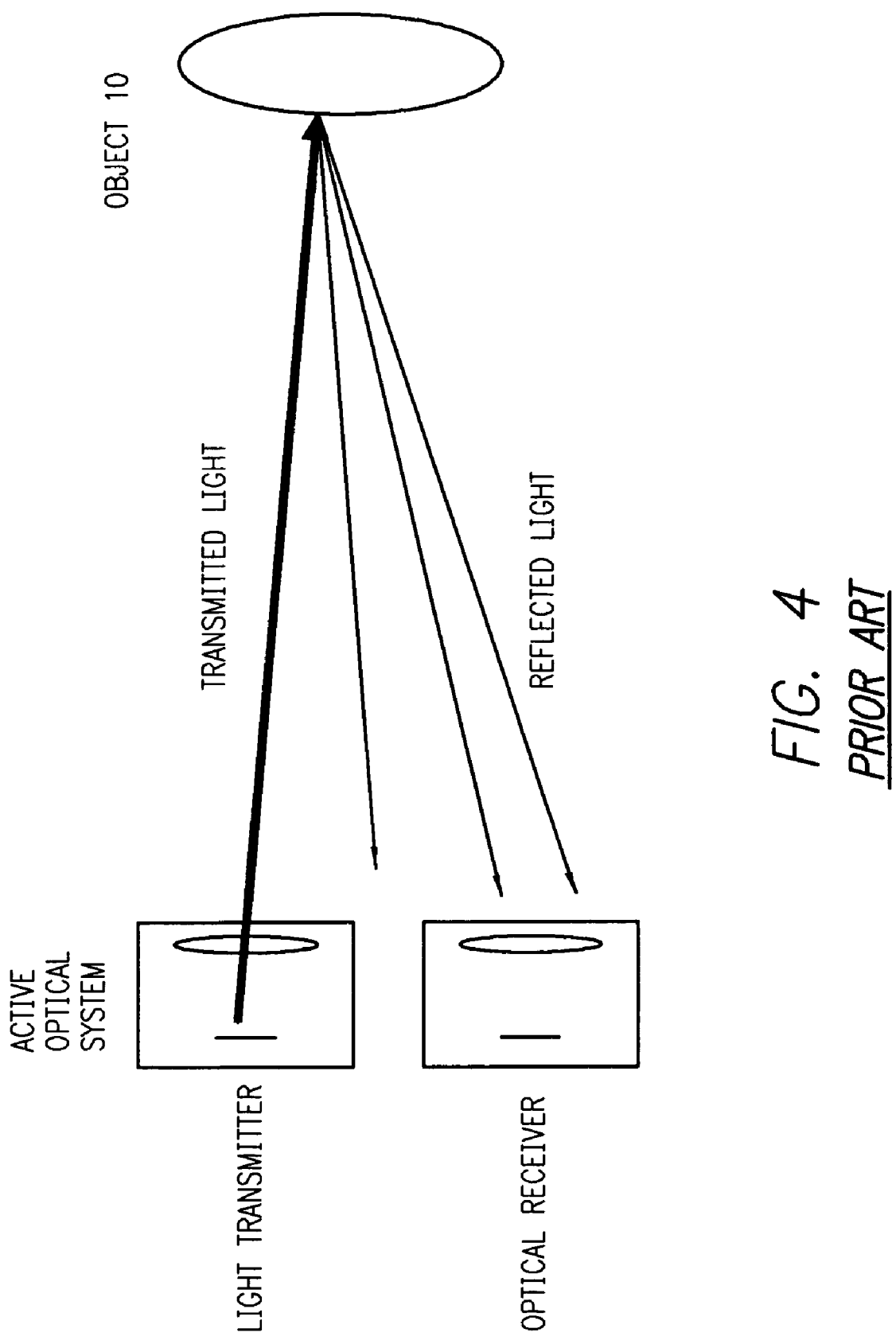
FIG. 4 is a conceptual diagram of a prior-art optical system having separate transmitting and receiving optics.

Another advantage of this system is that it eliminates the need for separate transmission and reception optics (FIG. 4) since only a single element is required to perform both operations. We conceptualize the relationship by referring to the corresponding points of the TX/RX image plane and the object plane as conjugate focal-plane elements.

Each focal-plane element 18 (FIG. 5) of the projector corresponds to a focal-plane element in the object plane 22. This conjugate relationship is maintained for both transmitted and received photons, since both operations are performed by the same focal-plane element—passing light in both directions, as already discussed. Work on some preferred embodiments has shown the TX path from the laser subassembly to have an operational net transmission of forty-six percent and the return incoming signal from a scene to have an anticipated twenty-five percent transmission to the detector.

System Assembly-

In preferred embodiments of the invention, the system assembly 50 can include five major subassemblies. These subassemblies include a detecting device 52, a laser 70 or other light source, and a microelectromechanical system (MEMS) 60—or more generally a micromechanical system, as components of this system are not necessarily operated or powered electrically. The system assembly can further include beam steering 62 and beam splitting 64 subassembly devices.

It is preferred that these subassemblies be integrated so that the output of the source subassembly is projected onto a fiber bundle array 16 attached to the beam splitter. The beam can be transmitted via free space or through fiber-optic cables, but for detection and ranging ordinarily at least the final segment directed to remote features of interest is by free space. Where free-space transmission is used, usually lens assemblies direct the light appropriately.

The beam splitter 64 separates an outgoing optical signal from a returning optical signal—both routed by the beam steering subassembly. This arrangement enables outgoing light from a source such as a laser to be directed to objects of interest, and returning, reflected light to pass in the opposite direction to the detector subassembly.

Figure 6:
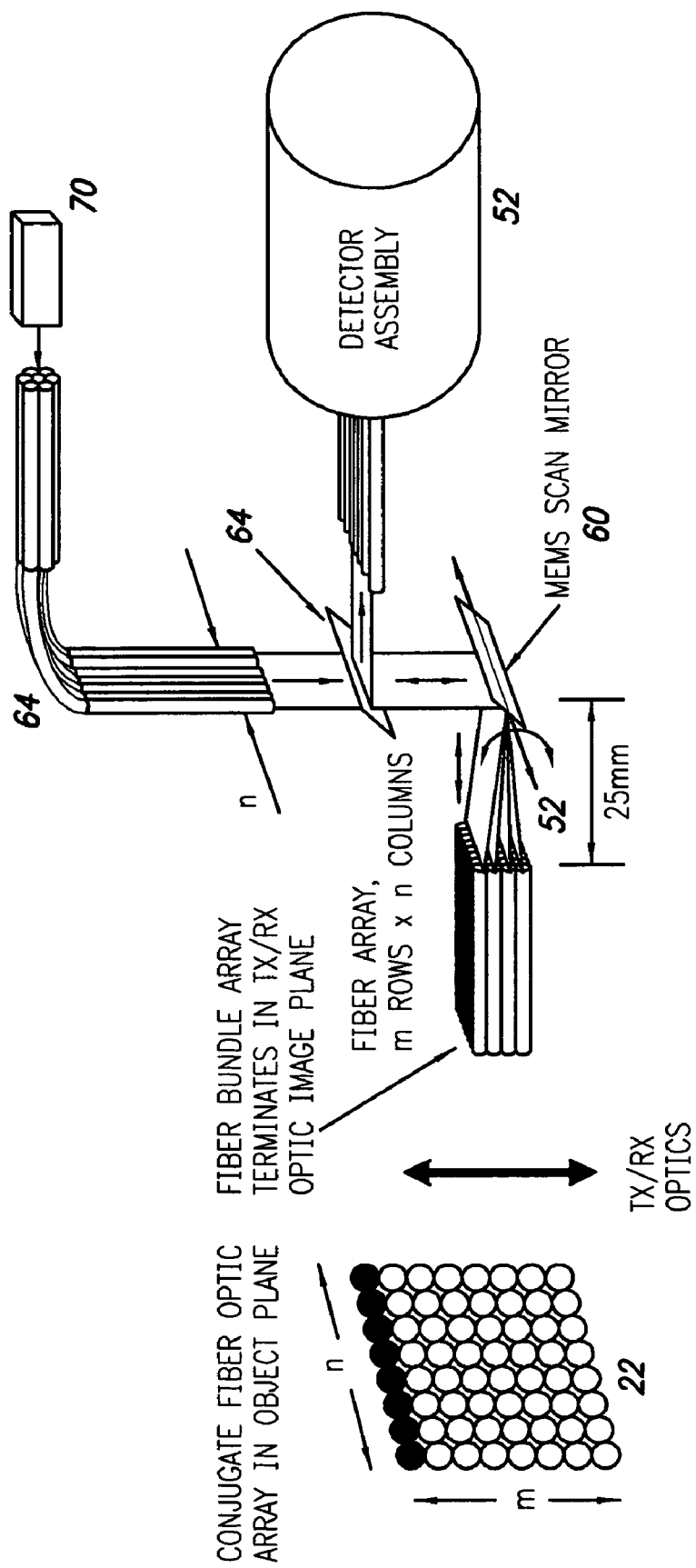
FIG. 6 is an elevational view, somewhat schematic, of a preferred embodiment of the invention with a single-axis MEMS scanning mirror that scans among entire rows of the object field at a time, and with substantially direct optical connection from a beam-steering unit to a transceiver.

While passing in opposite directions, the two beams share a common path and the same components (FIG. 6). The beam steering subassembly 62 is responsible for switching the outgoing laser signal and incoming optical signal returns between the TX/RX projector elements and the system assembly.

The source subassembly can consist of any of a variety of light sources. In particularly preferred embodiments it is a lidar system. (The term lidar or "light detection and ranging" encompasses use of any optical source, including "ladar" in which the light comes from a laser.)

It is also preferred that the light source be controllable, for example with the use of a sensor controller. This can be done using a master clock signal and controlling laser integrated with the beam steering device and other system components.

Use of embodiments for passive imaging requires neither a laser subassembly nor a beam splitter, since as noted above there is no outgoing light signal. Therefore, during passive imaging, an energy signal (i. e. a flow of photons) from an observed scene or object is directly transferred from the beam steering subassembly to the detector. This type of passive imaging typically provides two-dimensional information.

Active imaging, in which an object or scene of interest is illuminated by the system, can be used to acquire three-dimensional imaging information. This is accomplished by the use of a modulated or pulsed illumination source e. g. a modulated or pulsed laser.

In the case of a frequency-modulated beam, it is used to continuously illuminate a scene. The resultant returning signal from the scene can then be detected and processed to determine ranging information based on the frequency pattern embedded in the original beam.

This ranging information can then be used to provide depth to the resulting image. Analogously in the case of a pulsed laser beam, the ranging information is based on the pulse pattern of the resulting incoming signal from the scene.

In preferred embodiments, a processor is used to interpret the time-resolved beam for detecting and ranging. It is also used to control the light source and to synchronize it with the detector subassembly.

Figure 7:
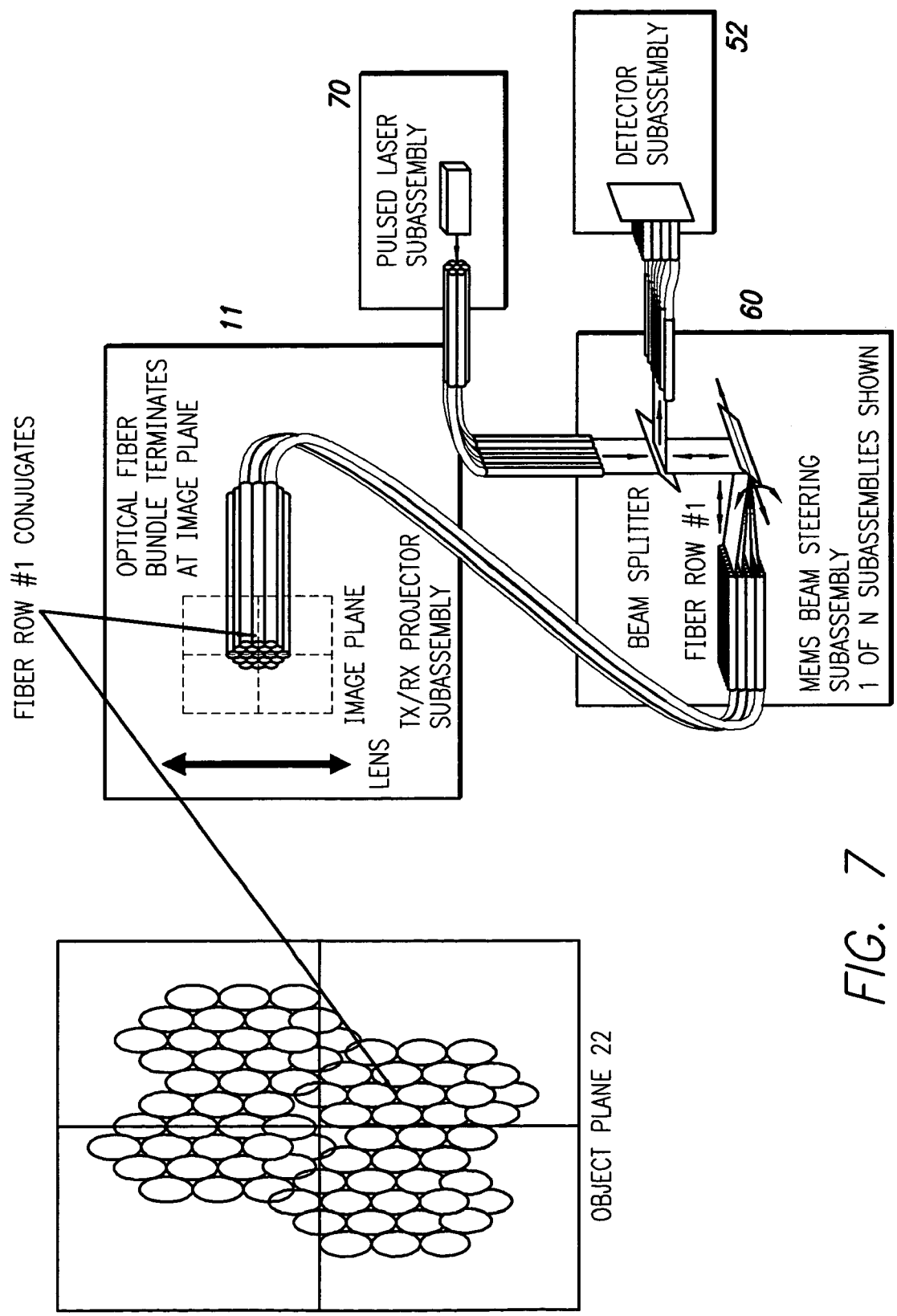
FIG. 7 is a like view of a similar system but having an optical extension, in the form of a flexible optical-fiber light pipe, between the beam-steering unit and transceiver.

A preferred embodiment of the invention uses a staring or flash lidar system that captures an entire time-resolved scene at an instant in time and a MEMS scan mirror for the beam steering subassembly (FIG. 7). An outgoing signal begins at the laser subassembly, which in this example is a pulsed laser capable of active imaging. In some cases collimating optics (not shown) are helpful, even though the laser or other source light may be nominally collimated.

The pulsed laser beam passes through a polarized beam splitter and is then reflected by the MEMS beam steering mirror to guide the transmitted lidar beam onto a line of a fiber optic array. The light is transmitted along the fiber pigtail and terminates in the image plane of the TX/RX optics.

In this example, the MEMS scan mirror rotates about a single axis, steering the collimated beams of light from a line of fiber bundles illuminated by the laser. The scan mirror is aligned so that it moves forward by one row in the fiber array for each laser pulse, with each row mapped to a portion of the TX/RX optical field of view.

Light exits the TX/RX optics from each fiber in the image plane—illuminated at its other end by the laser light reflected from the MEMS scan mirror. The light is then projected to its conjugate location in object space.

When an object reflects the laser energy, the return radiation is focused on the outer face of the fiber array, entering the conjugate fiber in image space—that is, the same fiber from which the excitation beam originated. Thus the transmitted and returned energy flows exit and enter the same fiber in the array, thereby sharing the same TX/RX aperture.

The laser energy reflected to the optic fiber travels back through the fiber, reflects again at the scan mirror, but is then redirected to the lidar detector by the beam splitter. The line array scanning system used can be interfaced with either lineal or areal detector arrays.

MEMS Beam Steering—

The beam steering subassembly can be made up of any of a variety of instruments to meet particular needs or preferences. A basic function of this subassembly is to coordinate incoming and outgoing signals in a controlled manner. Accordingly, in preferred embodiments the beam steering subassembly consists of a MEMS or other mirror system, or an optical switch fabric, or a liquid crystal device (LCD) or a signal controlled birefringence device. These options are discussed separately below.

Mirror Array

Figure 8B:
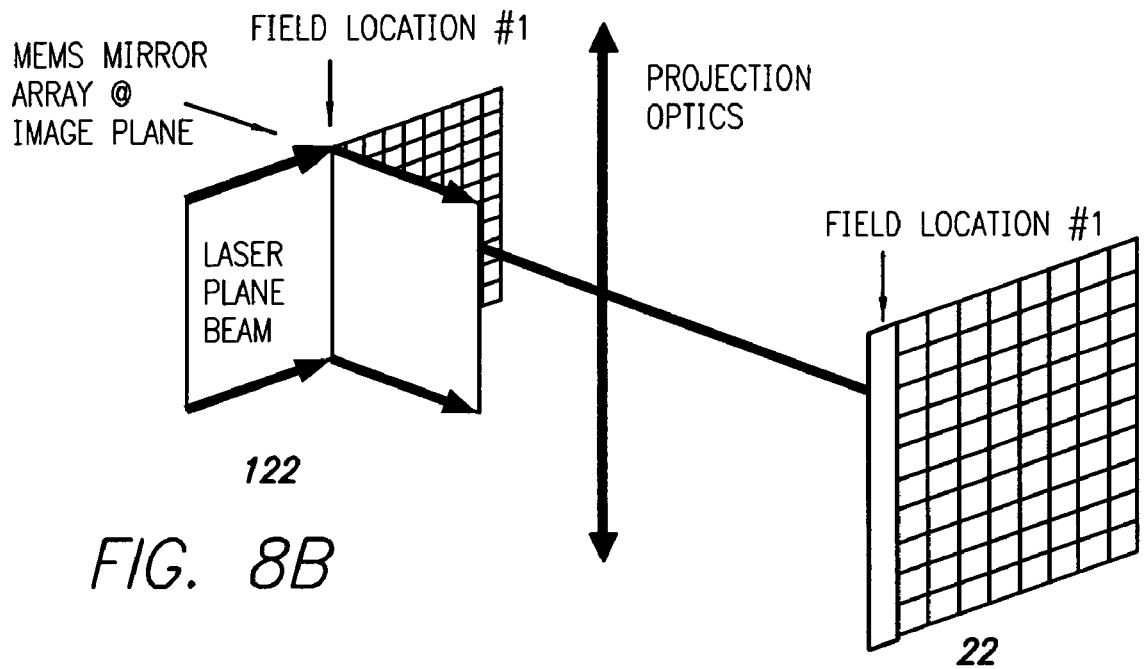
FIG. 8b is a like view showing a continuation of the FIG. 8a process, with the beam now deflected from another mirror column in a corresponding field location later in the series.
Figure 8A:
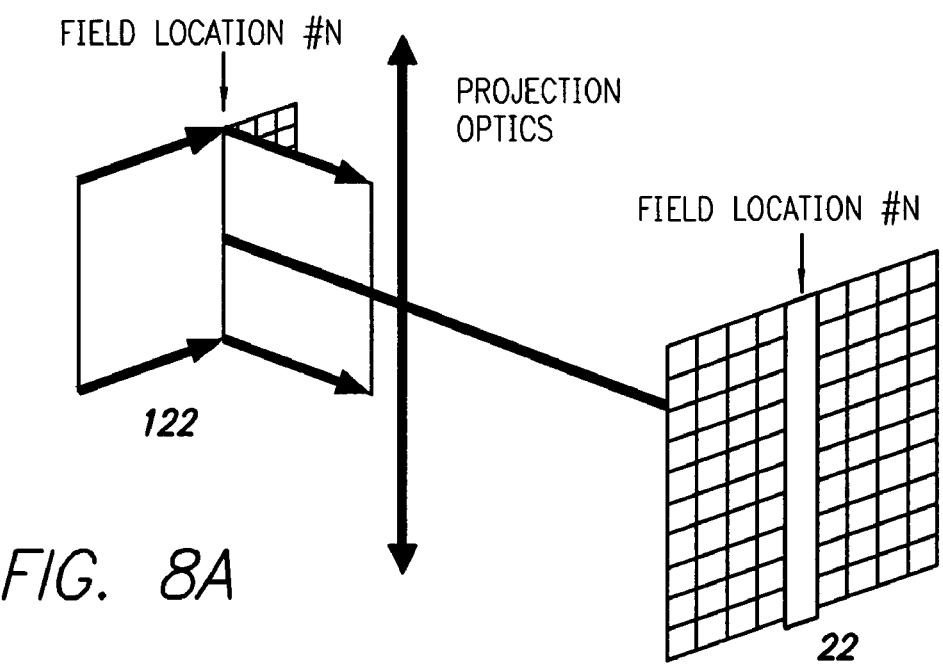
FIG. 8a is a schematic diagram of a mirror array near the image plane in a preferred embodiment, showing a process of laser-beam projection along the face of the array and beam deflection by a column of mirrors in the array—the beam then continuing to corresponding field locations in the object plane.

As a demonstration of how the MEMS mirror array functions, such an array located at or near the image plane of an optical system can be used to scan an outgoing beam of light across the field of view belonging to the optical system. Such scanning in object space is set up by directing a sheet- or fan-shaped light beam to skim along the face of the mirror array (FIGS. 8a, 8b).

When any one of the mirrors is deployed out of the array plane (i. e. tilted up out of the plane of the array), that mirror intercepts its corresponding portion of the beam and redirects that portion outward at an angle from the face of the array.

Preferred embodiments use an entire column, rather than just a single one, of the MEMS mirrors in one field location 1 (FIG. 8*a*) to intercept the fan-shaped beam skimming along the common plane of the undeployed mirrors.

A column of the mirrors is selectively deployed to stand out from that plane at a forty-five degree angle and thus reflect the beam down the optic axis of the projection system. Other field locations N (FIG. 8*b*) are successively addressable in the same manner. The return energy is collected by the same optical system and redirected by a beam splitter to a detector array.

Figure 9:
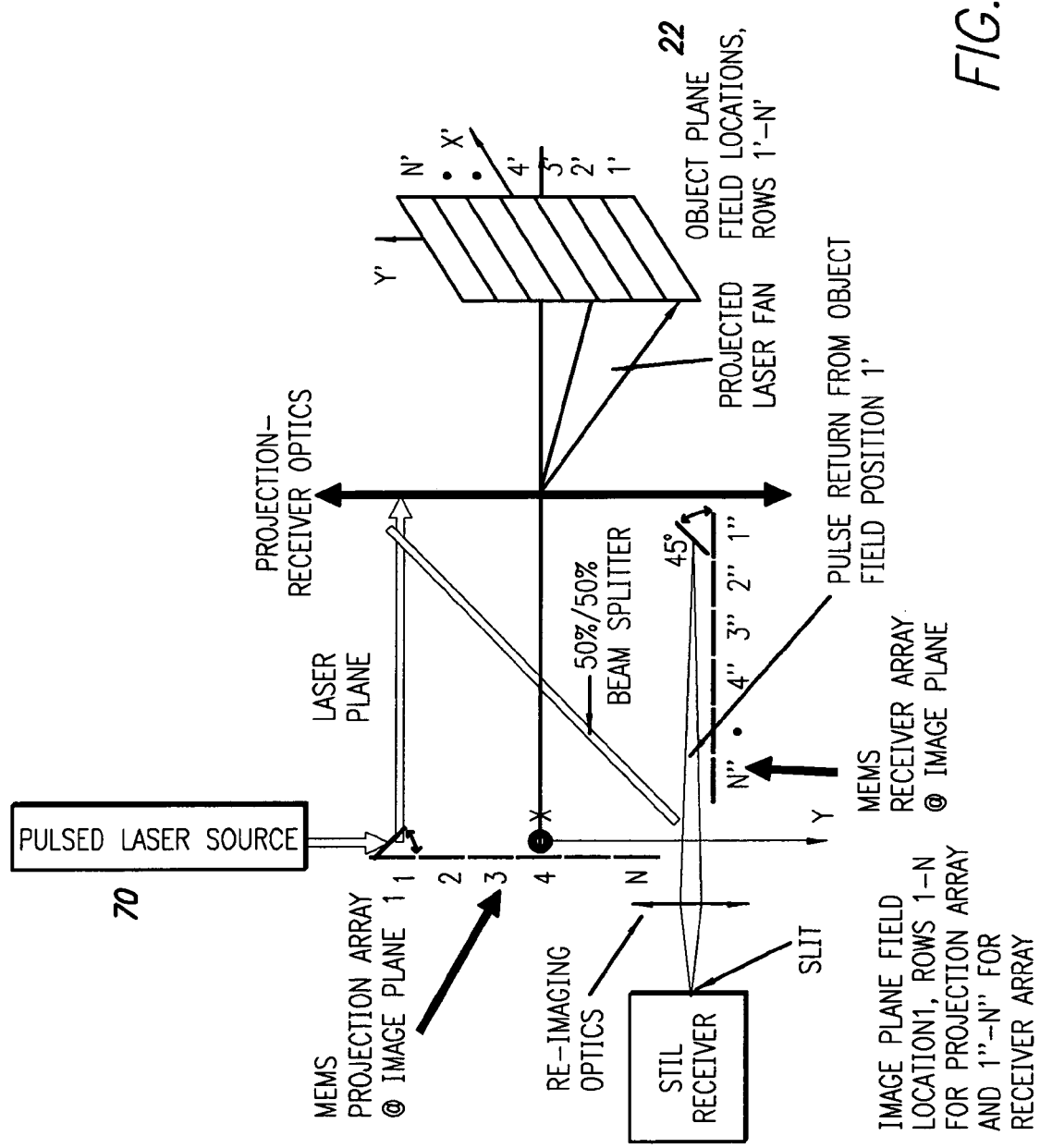
FIG. 9 is a like view, but showing relationships within the beam as it is manipulated by the mirrors in passing both to and back from the object plane.
Figure 10:
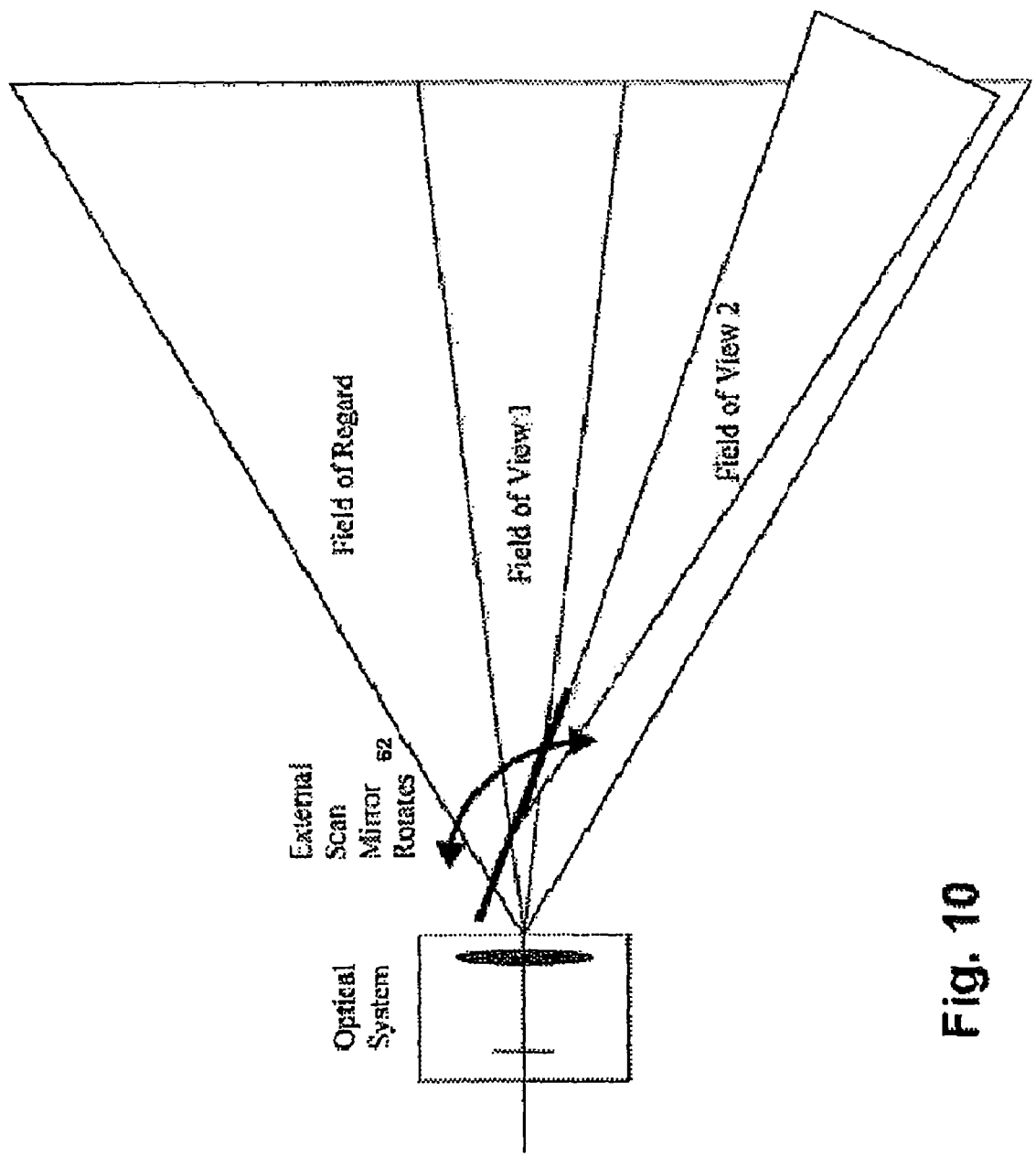
FIG. 10 is a conceptual diagram of a prior-art external scan mirror, rotating to increase the field of view for an associated optical system.
Figure 11:
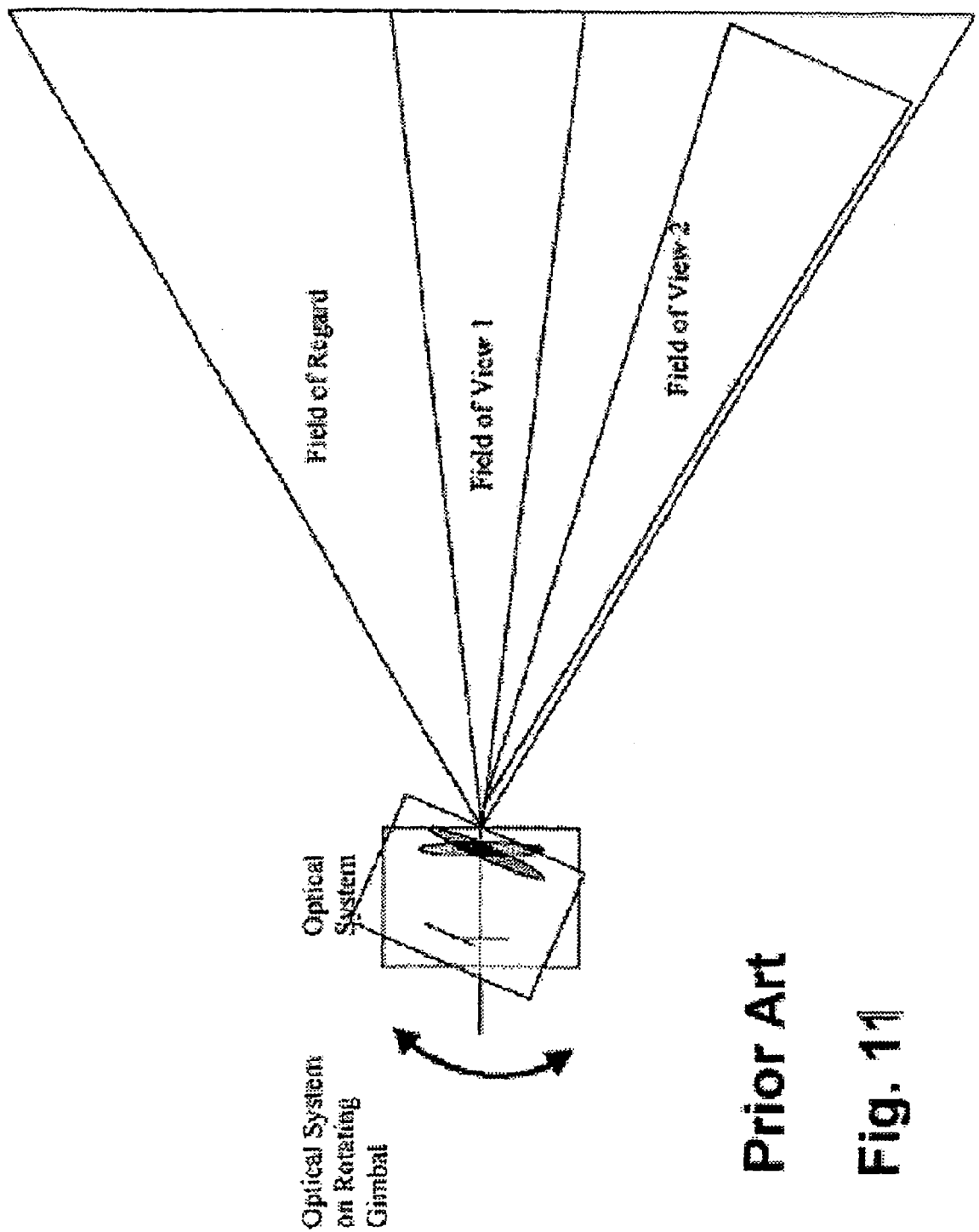
FIG. 11 is a like view of another prior-art optical system, gimbal-mounted to increase its field of view.
Figure 12:
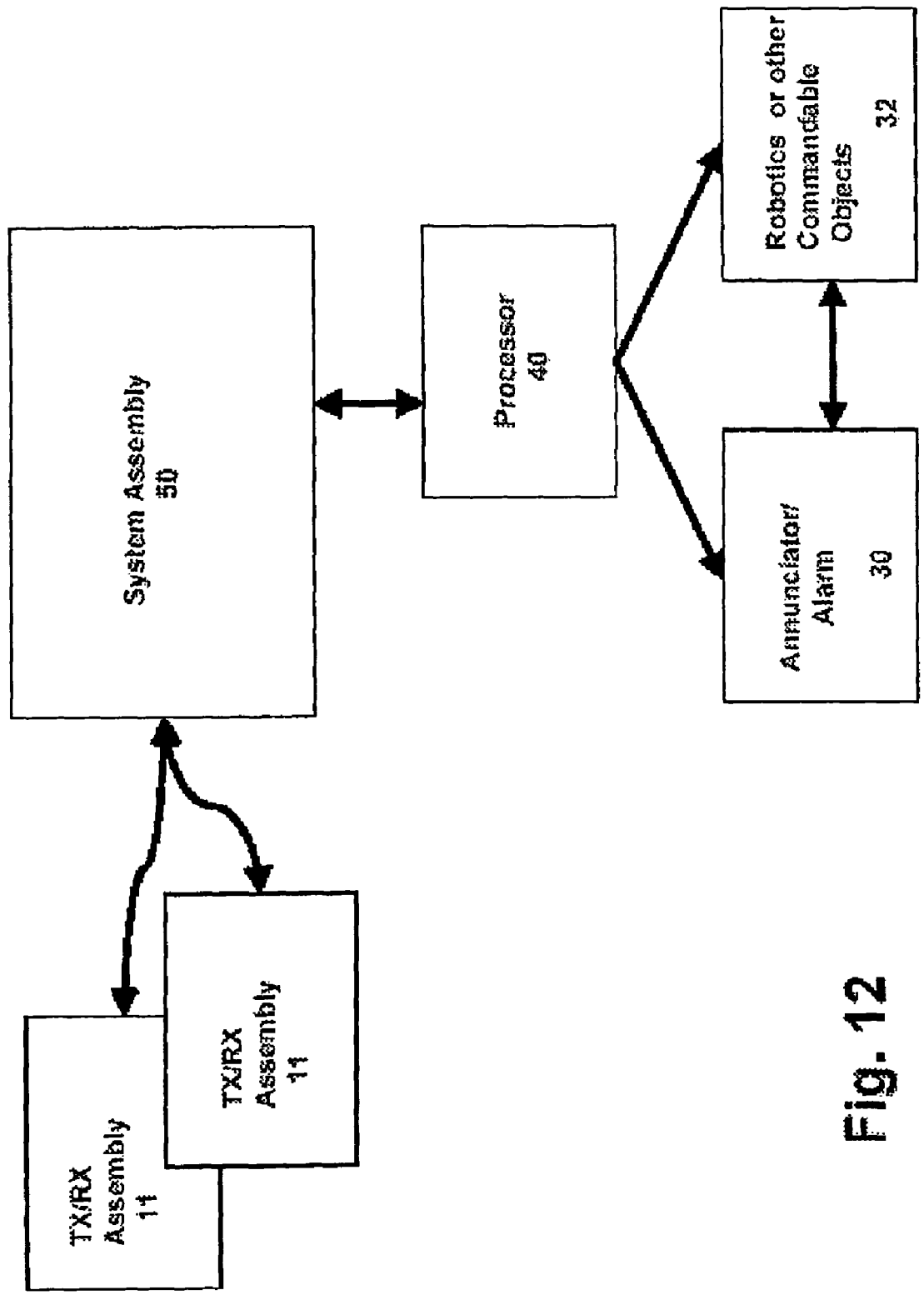
FIG. 12 is a view like FIG. 3 but at a somewhat higher level and also including utilization means connected at the output of the system.

Thus the source continuously projects light in a planar configuration onto a MEMS-mirror projection array (FIG. 9) near the image plane. Both the outgoing signal and an incoming signal pass through the imaging optics.

As before, the image-plane field locations are conjugate to the object plane field locations—as are the projection array and receiver array locations, respectively. Resulting image-signal pulses arrive in a kilohertz range.

At least for operation in the visible through infrared, this embodiment has a relatively narrow field of view because the convergence distance of the projected fan-shaped light beam is limited to only a few object-plane rows. This limitation, evidently associated with diffraction, can be mitigated by operation at shorter wavelengths.

Because the light pulses are of frequencies on a kilohertz scale, this embodiment is relatively slower than other preferred embodiments described in this document. Nevertheless, this example is well suited for space-based and other applications that are amenable to slower imaging.

Scanning Mirror

In particularly preferred embodiments of the present invention, however, the beam steering subassembly is a MEMS scanning mirror placed within the optical system. This phrase means that the mirror precedes an exit pupil, with respect to light being transmitted to objects of interest; and follows an entry pupil, with respect to a return beam from such objects (as noted earlier in the "Summary of the Disclosure" section of this document). Use of such a mirror increases the field of regard with no need for extra apparatus such as a gimbal mechanism, gimbal drive train—both seriously subject to wear—or the associated relatively high-power drive circuit.

Figure 13:
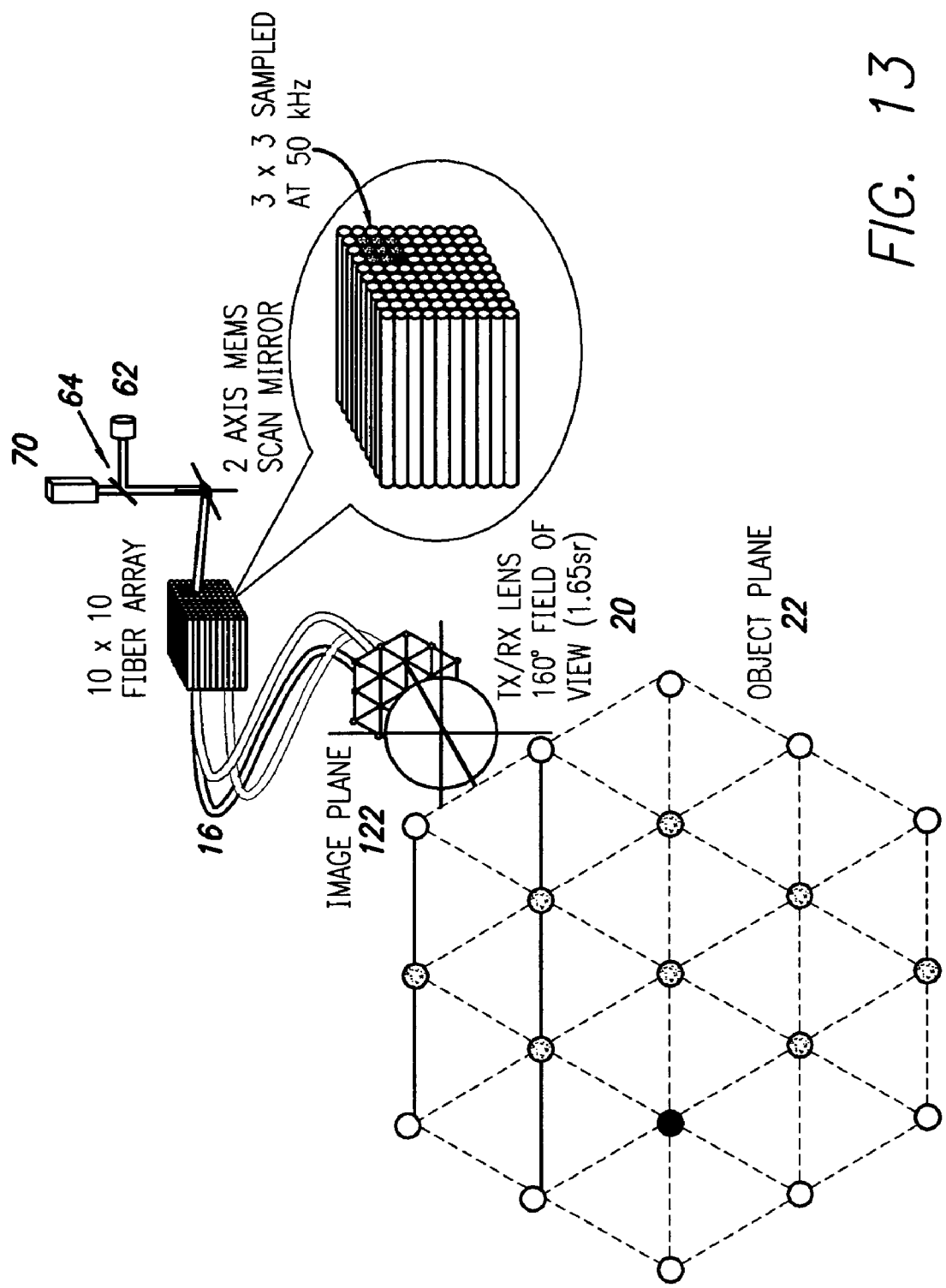
FIG. 13 is a view like FIGS. 6 and 7 but with a two-axis MEMS mirror to scan an object field in a raster-like rather than row-wise sequence.

In a preferred scan mirror embodiment, a single point in the field of regard is interrogated at an instant in time by either a one- or two-axis MEMS scan mirror (FIG. 13). In related embodiments a conventional small tiltable mirror can be used instead of a MEMS mirror.

In either case the mirror can be set to do an arbitrary scan, or a raster scan, of a scene. In the case of a raster scan system, one single optical fiber—instead of a row of fibers—is addressed at a time (FIG. 13).

Also for this example a two-axis mirror is preferred so that any point in the n-by-m fiber-optic array can be addressed randomly (i. e. in an arbitrary sequence). This embodiment is preferred for a laser-designator operation or a detector configuration that has only a single photosensitive site.

Additionally a microlens array or a lens system can be inserted to focus outgoing signals onto the fiber optics array. Moreover, a group of mirrors can be used together if a large enough outgoing light beam is used and the system is structured to address one fiber at a time rather than a whole row of the fiber optic array.

Preferred embodiments of the invention are amenable to extremely great latitude in dimensions, numbers of fibers, and operating speeds. That is because the invention generally works well without regard to specific values of these parameters. Thus for each project these variables depend very strongly upon the application, the kinds and sizes of objects to be considered, and the available resources—particularly including funding, permissible lead time to complete the work, and the commercial packages (fiber bundles etc.) with closest dimensions that happen to be found.

Accordingly the dimensions of an oscillating scan mirror may be, merely by way of example, in a range from a few tens of microns wide to several millimeters or more; such a mirror may be roughly square, or may have a high aspect ratio such as 25:1 or 50:1. The most preferable tested embodiments use e. g. silicon scan mirrors in the range of 150 to 200 µm×1 to 10 mm; but again these dimensions are not at all limiting. Such a mirror typically rotates about its own axis with an excursion in the range of ±1° to ±10°.

In some preferred embodiments the scan mirrors are assembled in a pinwheel-shaped cartridge (FIG. 15), consisting of five four-mirror silicon MEMS substrates. Here a MEMS selection mirror at the center of the assembly rotates to address one of the four-mirror assemblies at a time.

In this example and analogous configurations, each MEMS scan mirror can address a fiber array that is on the order of tens to hundreds of fiber elements in each direction. Here too, such an array can be very generally square or can have an aspect ratio that is rather high, e. g. 10:1 or even 100:1—these parameters merely echoing the shapes and other characteristics expected for features of interest.

Particularly successful assemblies have used square arrays of fibers, between thirty and forty fibers on a side, e. g. a 33-row by 33-column fiber array. Such an array can be addressed at a rate of one row per few tens of microseconds, e. g. 40 to 70 µsec. This procedure typically results in addressing ten thousand to several tens of thousands of fibers in each assembly, at a rate of 10 to 500 Hz or more. Again only by way of example, four of these assemblies can cover a 6°×6° field of view at 400 µrad sample spacing.

Figure 14B:
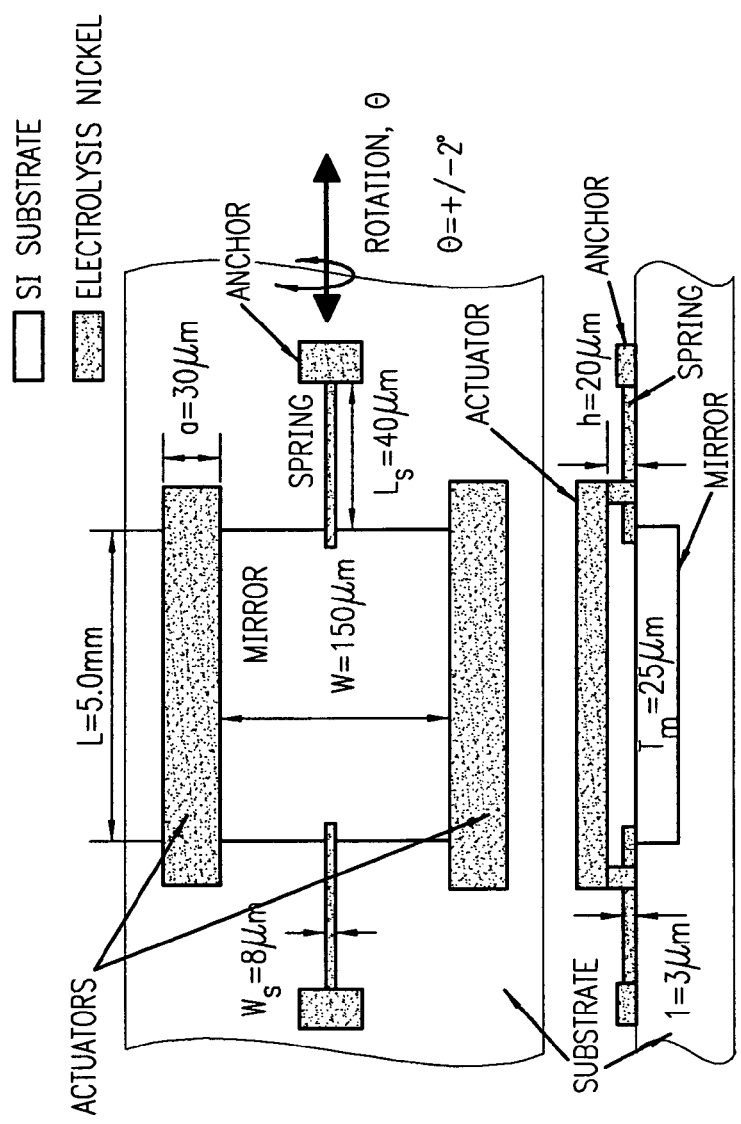
FIG. 14 is a combination of plan and elevational schematic diagrams, also with mask design, for a MEMS scan mirror in a preferred prototype of the invention.
Figure 14A:
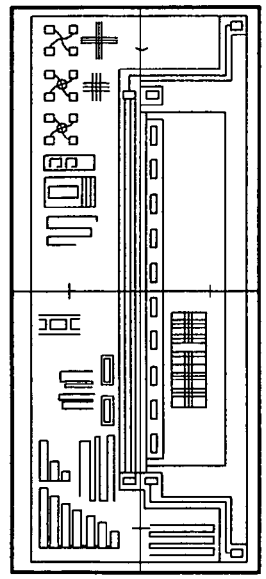
Figure 15:
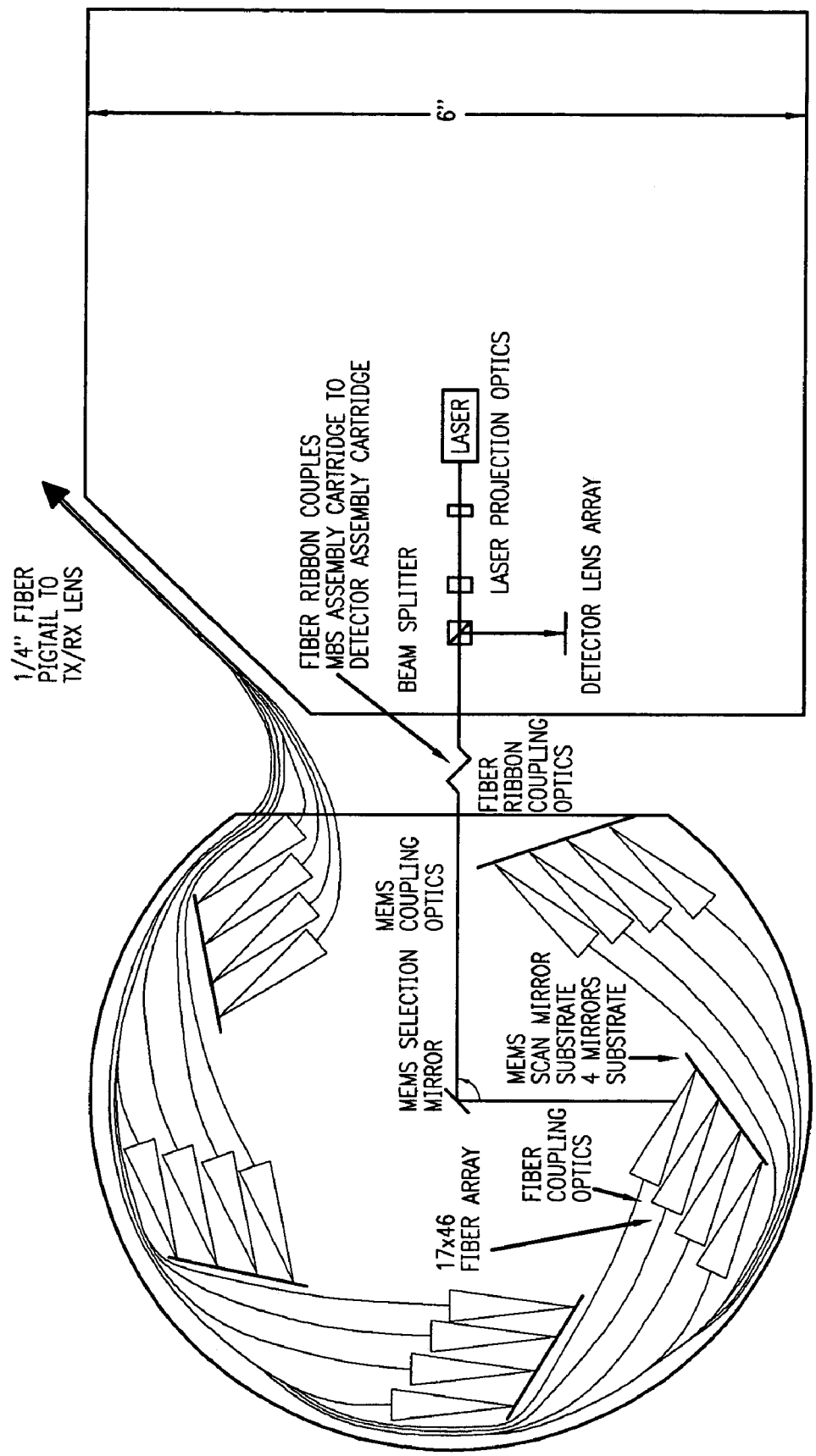
FIG. 15 is a schematic diagram of a preferred embodiment of the invention showing a MEMS beam steering subassembly as a so-called "pinwheel" cartridge, attached by a fiber ribbon to other components of the system assembly.

An exemplary scan mirror (FIG. 14) for such a "pinwheel" system works well in a preferable pinwheel mirror-containing beam steering assembly (FIG. 15). In this example, a laser beam is directed onto laser projection optics that focus the beam onto the aforementioned beam splitter.

From the beam splitter, this outgoing signal is directed to fiber-ribbon coupling optics that couple the detector to a beam steering subassembly; both these modules are preferably fabricated as independent cartridge units. Inside the beam steering assembly, the outgoing beam encounters MEMS coupling optics which direct it to the MEMS selection mirror.

From the selection mirror, the beam is focused on one of four scan-mirror substrates projecting inward from the edges of the assembly like angled spokes of a wheel. The beam then travels along fiber coupling optics to the fiber array, with dimensions in the ranges noted above—from which the beam is directed onto the next of the four scan-mirror substrates.

The beam continues along in this manner until it is directed out of the assembly cartridge/module via a fiber pigtail, a half-inch in diameter, leading to the TX/RX assembly. Returning signals follow a reverse path along the pigtail and into the beam steering assembly, eventually leading to the detector.

Optical Switch Fabric

In particularly preferred embodiments of the invention, the beam steering subassembly is an optical switch fabric. In this embodiment, several planes of optical switch fabric configured in a nonblocking arrangement replace the previously mentioned beam splitter and beam steering mechanisms.

Figure 18:
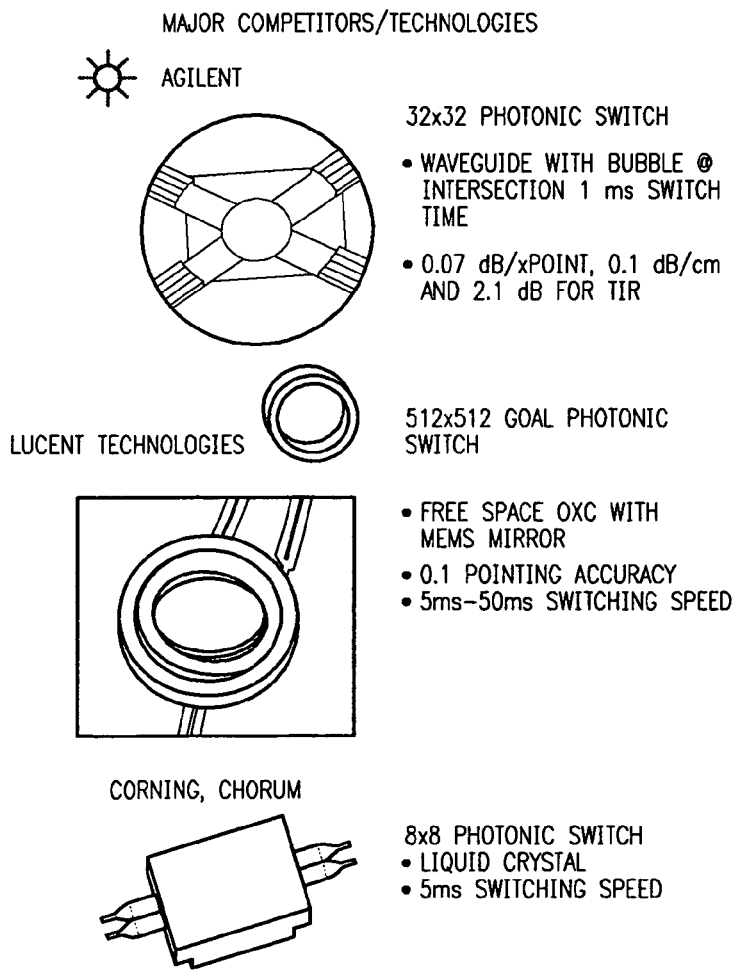
FIG. 18 is a set of comparative illustrations summarizing the general state of the art.
Figure 21:
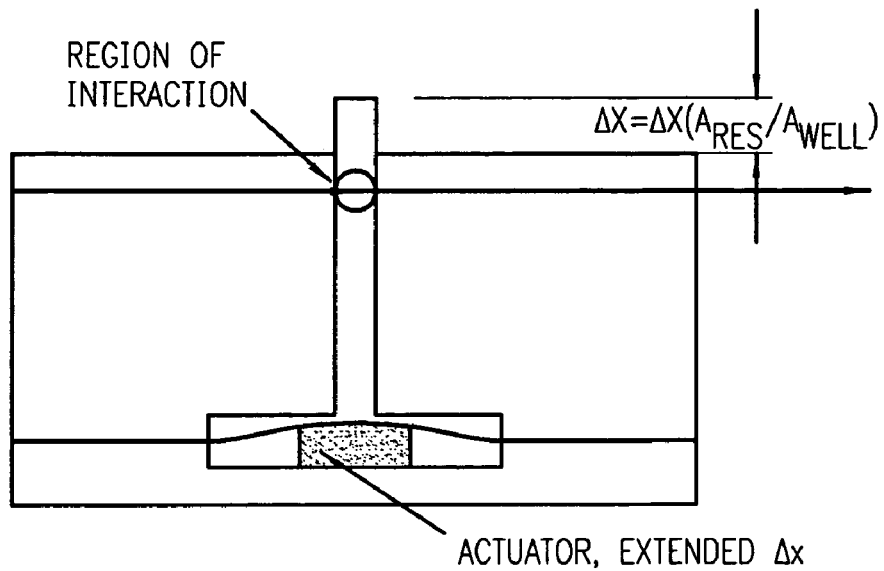
FIG. 21 is a like view for another preferred embodiment.
Figure 22:
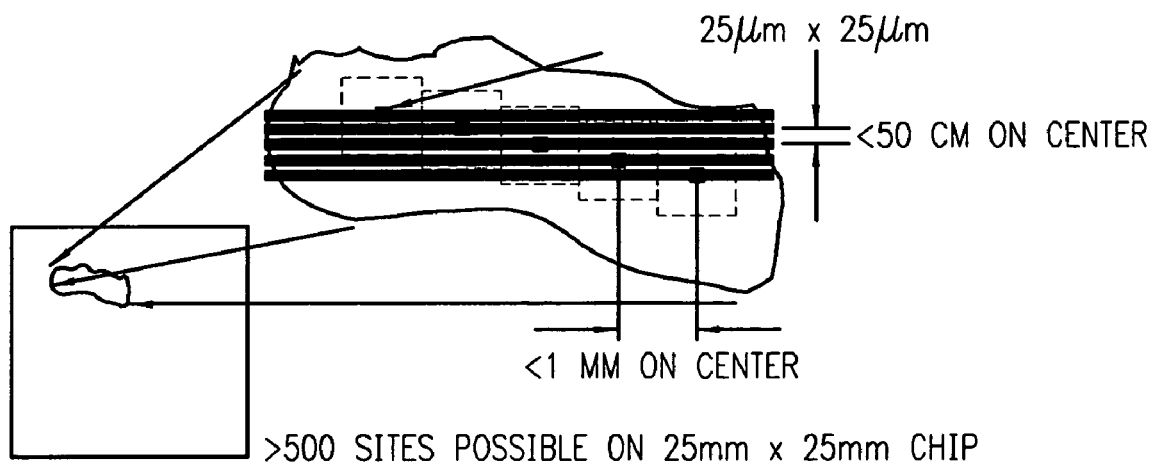
FIG. 22 is a conceptual diagram suggesting disposition of a large multiplicity of such switches on a single chip or in a fabric.
Figure 23:
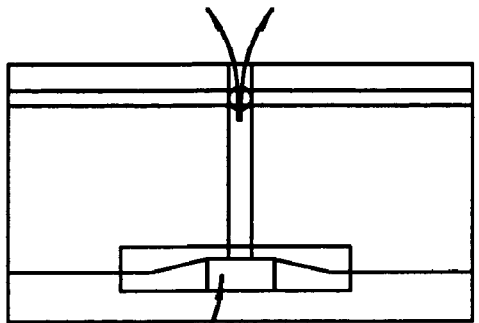
FIG. 23 is a pair of cross-sectional elevations analogous to FIGS. 20 and 21 but showing expulsion or acquisition of optical-switching fluid in the FASA well.
Figure 23:
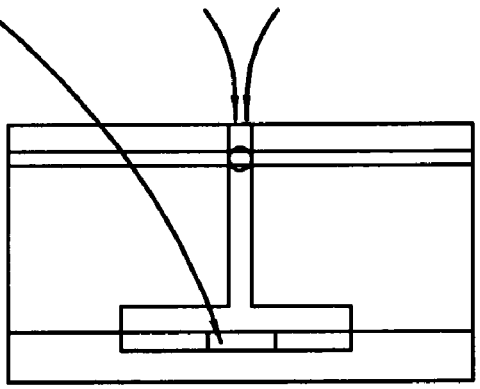
Figure 24:
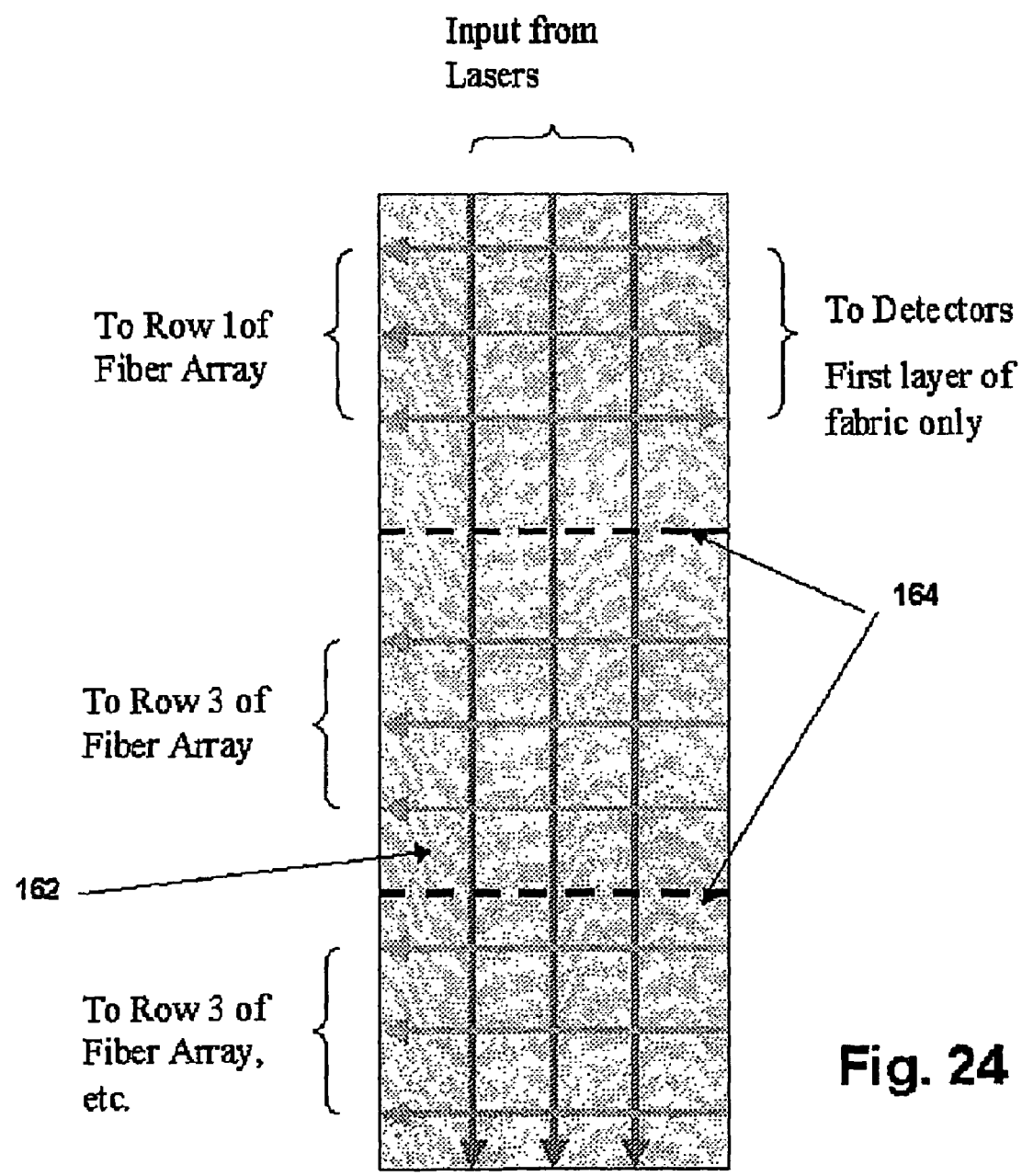
FIG. 24 is a plan view showing one preferred form of the optical switch fabric.

Light enters the fabric through one of its planes. The light is then routed to the first desired plane 1 (FIG. 18), and the appropriate intersecting switch routes the light into the fibers going to the TX/RX assembly.

Return from the object plane retraces the initial path through the switch fabric, with the fabric subassembly serving the function of the beam splitter in the previous discussion. The beam is steered by switching the appropriate switch fabric in planes 1 through N that corresponds to the different field positions in the TX/RX assembly, and correspondingly for the return beams.

The switch planes are attached together by optically continuous "jumpers"—or equivalently formed in a continuous strip, one or more rows being unused at the turnaround points between planes. In fact the optical switch fabric itself can be formed in many different configurations.

In a preferred embodiment it is an all-optical switch. A particularly preferred form of this embodiment is the "fluid-based actuator stroke-amplification" (FASA) system described in detail in the coowned and above-referenced U.S. patent application of Kane et al.

Figure 17:
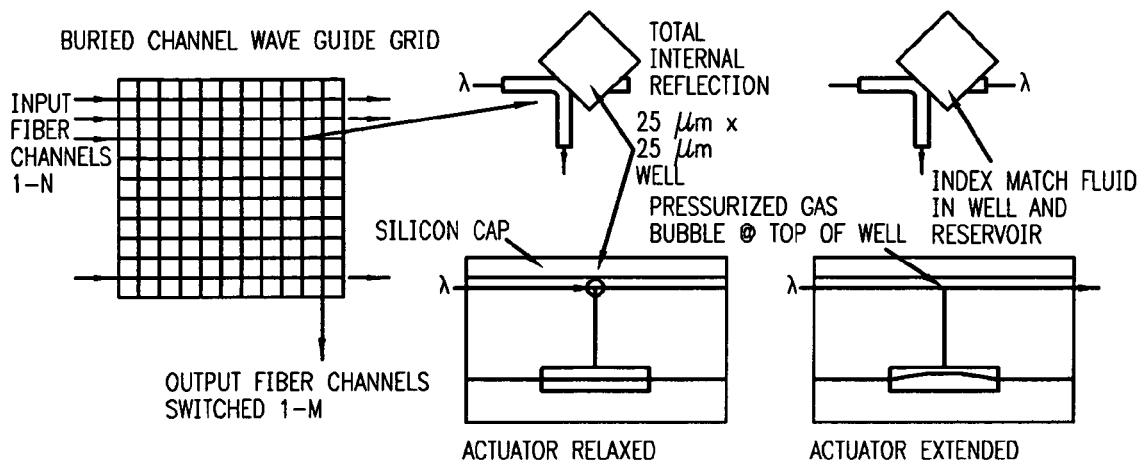
FIG. 17 is a multipart diagram, adapted from the Kane patent document mentioned earlier—showing:
- at left a waveguide-array grid,
- at upper right two plan views of one individual wave-guide of the array, with the FASA (fluid-based actuator stroke-amplification) controller in the left-hand one of those two views set for reflection, and in the right-hand one of those two views set for transmission—and
- at lower right two corresponding elevational cross-sections as before (i. e. the left-hand one showing reflection and the right-hand one, transmission)

This embodiment is an all-optical crossconnect system that uniquely "switches" incoming light from fiber-optic channels 1 through N into outgoing channels 1 through M (FIG. 17). In this implementation, waveguides are configured in a grid arrangement, with some of the waveguides lying along one direction for incoming light, in channels 1 through N (FIG. 18), and others along an orthogonal direction for outgoing light, channels 1 through M.

At each intersection is a FASA well that is at a 45° angle, with a column perpendicular to the waveguide gridwork as shown. At the base of each column is the reservoir for the FASA module and its forcing actuator.

When the actuator is relaxed, a gas is present at the waveguide intersection, and total internal reflection (TIR) occurs for any light entering horizontally—which is accordingly reflected vertically as shown, due to the difference in refractive index. When the actuator is extended Dx, the index-matched fluid column relative to the waveguide will rise by Dx—and transmission through the intersection results.

A FASA module is located at each horizontal/vertical wave-guide intersection or node. By virtue of its ability to independently switch each FASA unit, the assemblage becomes an optical-switch array or fabric.

Figure 16:
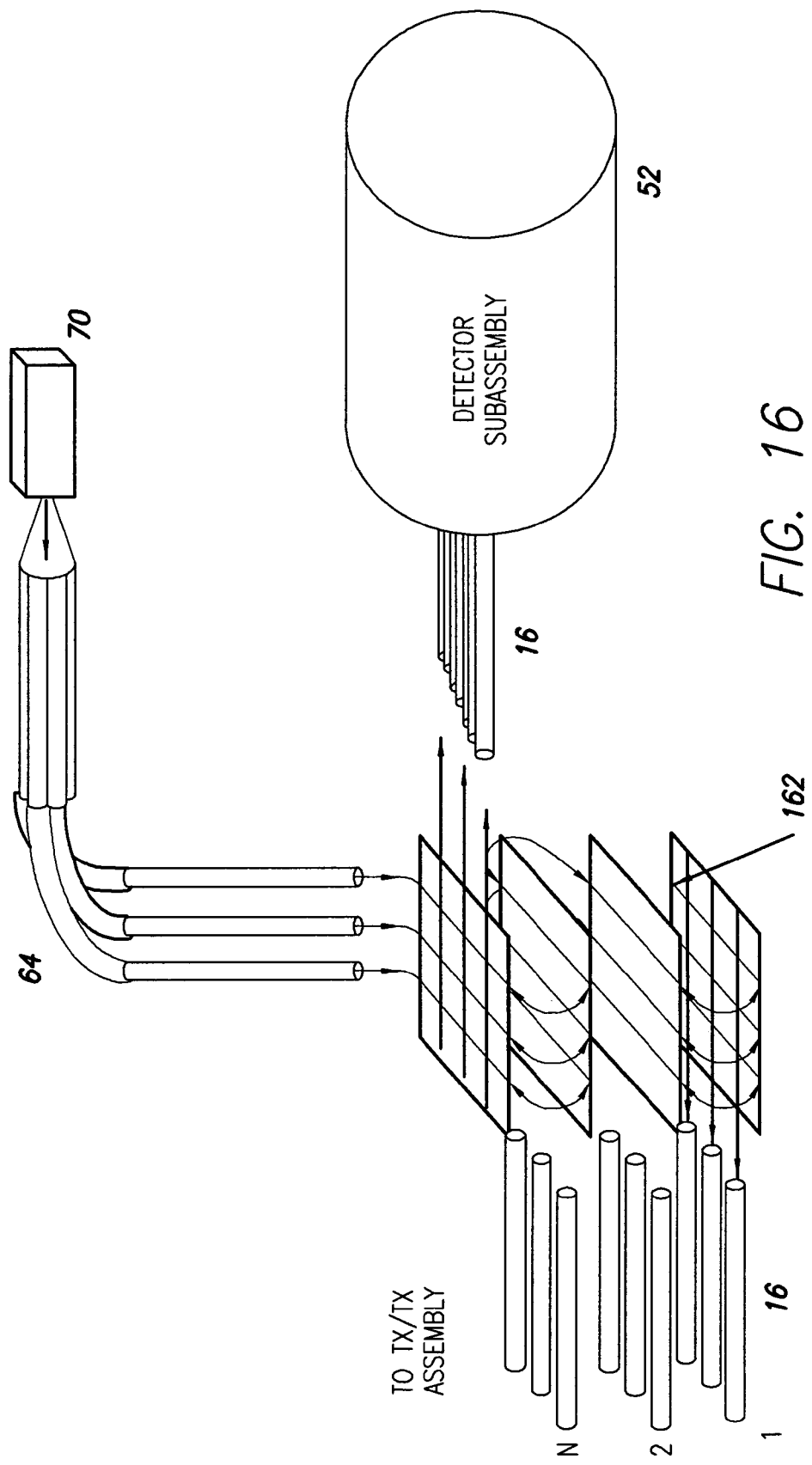
FIG. 16 is a diagram of a preferred embodiment of the invention using an optical switch fabric for beam steering.

In some preferred embodiments the FASA waveguide mesh is a relatively rigid or stiff grid, with the optical-guideway column extending perpendicularly through the waveguide grid (FIG. 17). Such grids, however, can instead be made flexible—for example using the previously mentioned "jumpers", or unused intermediate fiber rows—to form a variety of structures that include but are not limited to a spiral, coil, serpentine figure, folded sheet, roll or pinwheel. A particularly preferred embodiment uses a multilayered S-shaped configuration of the optical switch fabric (FIG. 16).

The flexibility of such fabric configurations allows a user to adapt the optical switch system to meet specific needs or preferences. Ideally the layers of the fabric are planar; however, nonplanar layers are also possible, as long as the nonplanarity is acceptable in terms of the total-internal reflection within the waveguide.

The layers are best produced using lithographic techniques known in the art. This enables spacing within the layers to be very accurate even at spacings below one micron. In preferred embodiments, spacing between the folds of a folded fabric is typically on the order of 100 to 250 μm.

In forming the sheets, alternative to or in combination with the possible configurations mentioned above, extra space can be left between the rows of the fabric to accommodate the folding, or the fabric can be designed so that all the rows bend upward at certain points in the fabric. A previously mentioned possibility to facilitate folding of the fabric, once again, is to connect the layers of fabric using a separately made "fiber pipe" between the sheets.

In this case, the fiber pipe connects sheets of the fabric without actual folding; the pipe simply connects edges of one sheet to another sheet layered on it, while allowing both sheets to lie flat. If a faulty or unsuccessful junction is produced, however, it may preclude the use of one or more rows in the fiber—depending on where in the fiber the faulty junction resides.

In preferred embodiments, the fabric layers are accurately aligned with corresponding fibers in the TX/RX assembly by the use of V-grooves formed—also using a lithography process—in the adjacent waveguide faces. These grooves align the waveguide channels to the fabric so that the connection from the fabric through to the lens system is consistent.

The optical switch fabric can also be adapted to work directly with light sources to not only steer an outgoing beam but modulate or pulse it as well. For example the sources may be very small lasers, LEDs or the like—embedded within the fabric or connected along edges, etc. In preferred embodiments of such switch-to-pulse configurations, the fabric receives continuous-wave (CW) light—preferably laser light—from the source and switches the light briefly to each projector, or fiber row, or individual fiber in turn.

The result is to strobe each conjugate point, or defined group of points, on a pulse basis even though the optical input to the fabric is CW. Nodes in the fabric then switch to receive and redirect any returning pulse or modulated light signal to the detector subassembly—while at the same time strobing the next conjugate point in succession.

This sequential operation can proceed continuously, sending light pulses to many object-plane features in quick succession, provided that multiple detectors are present (e. g. embedded in the fabric itself) to collect the temporally overlapping return beams. Thus use of multiple detectors enables pulsing of all the features in an extremely short time—namely the actual duration of one pulse times the number of separate features to be pulsed.

As will be understood, return beams continue to arrive, trailing for periods of time that depend on object distance, after all the outbound pulses are completed. Some very roughly analogous operations are discussed in the earlier-mentioned, coowned patent document of Griffis et al.

Otherwise, in the more-general CN case with a smaller number of detectors (e. g. one), operation is typically limited to emitting just one pulse while collecting each immediately preceding return beam, respectively. This enables CW-light pulsing and return for all the features within the duration of one return-beam collection times the number of separate features pulsed—a significantly longer time than for the multidetector embodiment, but still significantly less than conventionally.

Pulsing can also be accomplished by splitting the original outgoing light into two standing waves and directing one counter to the other within a single waveguide (optical fiber). If the polarization states of the two component beams are maintained but the second beam is phase shifted by 180 degrees—while both travel along the same path—the two beams interfere destructively. (This technique is reported in the literature, for other applications.) A pulse is created by phase-shifting the second beam back and forth.

Liquid Crystal Devices (LCD)

In other preferred embodiments the beam steering subassembly is replaced by components such as liquid crystal devices, used singly or in an array. An LCD does not emit light but has the ability to control light passing through it.

When a voltage is applied to polarization plates surrounding a liquid crystal medium, the direction of polarization of the medium changes. This in turn controls whether light passing into the medium is reflected from the crystals or passes through.

In this manner, light transmitted from or returned to the system can be directed along desired paths, generally as in other embodiments which this document describes. LCD control, however, is generally much slower than the switch-fabric or tilting-mirror systems discussed earlier. The arrangement of LCDs can vary when used in an array.

In preferred embodiments, discrete areas in an LCD are tightly grouped—as in consumer-electronics displays (wristwatches, vehicle control panels, etc.). The individual areas are, advantageously arranged in a coordinate system of rows and columns—or in polar, spiral, or serpentine arrangements.

Signal-Controlled Birefringence Devices

In other preferred embodiments different optical-control devices are used for the beam steering subassembly—particularly, one or more signal-controlled birefringence devices or other nonlinear-optics devices. Examples include small Kerr or Bragg cells, singly or in an array.

These devices route the outgoing and returning signal beams, as with the MEMS and LCD devices discussed above, but here by rotating the plane of optical polarization. By placing the device between crossed polarizers, the device can be made to serve as a high-speed shutter; alternatively the directional control obtainable straightforwardly through variable refraction can be used to provide multiple steering states. These devices, too are advantageously arranged according to a coordinate system or an array.

Distribution of Successive Signals Alone a Nontemporal Domain

Following, as noted earlier, are excerpts quoted from the above-mentioned Gleckler international publication (particularly, pages 3 through 6, and pages 30, 41 and 42) and Griffis U.S. application. The drawings referred to in those excerpts have also been copied into the present document. The purpose of these quotations is to clarify in particular the basic operations of a streak-tube system, and of the Griffis system which performs like functions without a streak tube.

More specifically, as will be seen from the following excerpts, both these prior inventions time resolve return-scattered laser signals by a mechanism that inherently can be generalized as distributing successive signals along a nontemporal domain. As will be seen, that domain in the streak tube is the physical surface of an output screen at the anode end of the tube; and in the Griffis system is a physical assemblage of electronic components—either along an array of discrete components, or along a delay line that has associated signal memory points, or within a microprocessor e. g. emulating a delay line.

From Gleckler:

BASIC TUBE ARCHITECTURE AND OPERATION: A streak tube (FIG. 25—from Gleckler FIG. 1) as conventionally built nowadays is very similar to a standard image-intensifier tube, in that it is an evacuated tube with a photocathode, producing electrons which are accelerated by very high voltages to a phosphor screen. In operation of a typical system, each such electron ejects roughly three hundred photons from the phosphor, which is then collected by an image-recording device such as a CCD.

A major difference is that a streak tube has an extra pair of plates that deflect an electron beam, somewhat as do the deflection plates in an ordinary cathode ray tube (CRT) tube used in most oscilloscopes, television sets and computer monitors. In conventional STIL operation, input photons are limited to a single slit-formed image—causing the electron beam within the tube to be slit-shaped.

A fast ramp voltage is applied to the deflection plates, very rapidly and continuously displacing or "streaking" the slit-shaped electron beam, parallel to its narrow dimension, from the top (as oriented in FIG. 25) of the phosphor screen to the bottom—effectively creating a series of line images formed at different times during the sweep. Thereby time information is impressed upon the screen image in the streak direction (here vertical), while spatial information is arrayed along the slit length.

The array of internal electronic line images in turn constitutes a latent areal image—which can be picked up ("developed") by phosphor on the screen. Most typically a charge-coupled-device (CCD) camera is attached to the streak tube to collect the image from the phosphor screen.

In this way the image is reconverted to an external electronic image by a CCD. The CCD output is digitized, interpreted, and if desired saved or displayed by receiving electronics.

One of the two dimensions of each two-dimensional image acquired in this way is azimuth (taking the dimension parallel to the long dimension of the slit as extending left and right)—just as with a common photographic or video camera. The other of the two dimensions, however, is unlike what an ordinary camera captures.

More specifically, the STIL images represent azimuth vs. range from the apparatus—not vs. the commonplace orthogonally visible dimension as with a common camera. Thus for example if a two-dimensional image of an ocean volume is acquired by an instrument pointed vertically downward into the sea, the two dimensions are azimuth and ocean depth . . . .

BASIC SYSTEM OPERATION: In a typical conventional streak-tube lidar configuration, a short-duration high-energy laser pulse is emitted. The emitted beam is spread out into a single thin, fan-shaped beam or line, which is directed toward a landscape, ocean volume, or other region of interest—and the receiver optics image the line back onto the slit input to the streak tube . . . .

Figure 2:
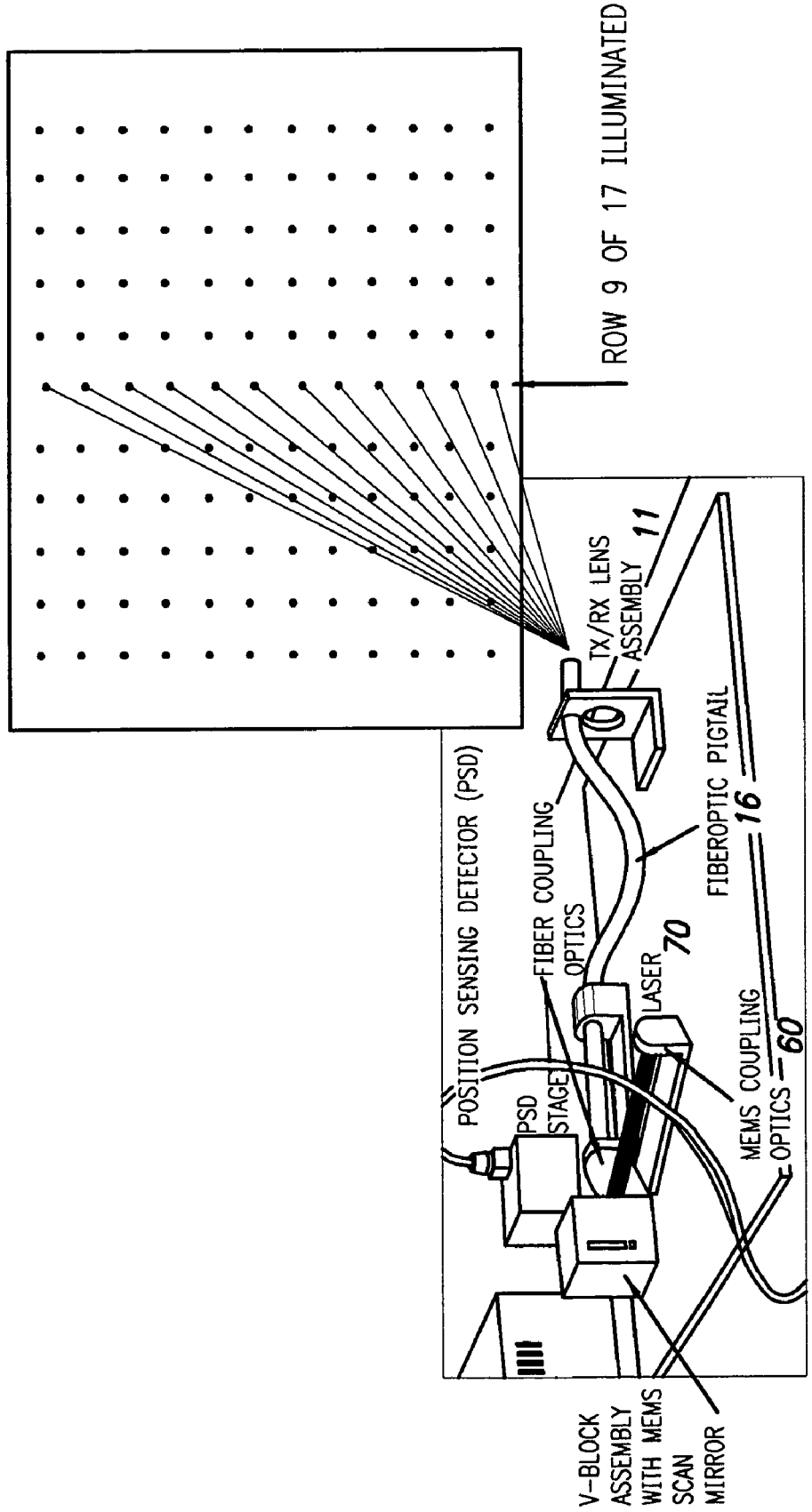
FIG. 2 is an elevational view of a preferred prototype embodiment, showing laser light illuminating one column of an optical array—and with white dots representing unilluminated sample locations of the array members.

In such a standard STIL system, coverage of the region of interest in the dimension perpendicular to the line illumination (FIG. 26—FIG. 2 of Gleckler) is generally accomplished through motion of a vehicle carrying the emitter and sensor successive pulses of the beam. Formation of a complete volumetric image therefore requires a series of pulses, each yielding a respective individual range-vs.-azimuth image.

Taking the laser projection direction as horizontal in FIG. 26(a), the vehicle direction should be vertical—as for instance in a vertically moving helicopter. In this case, each areal screen image represents a horizontal map, at a respective altitude, with the measuring instrument located above the top edge of the map and the remote horizon along the bottom edge.

Alternatively, reverting to the earlier example of a downward-looking instrument over the ocean, vehicle motion should be horizontal. In this case each areal screen image represents a vertical slice of the ocean below the vehicle, at a respective position along the vehicle's horizontal path.

This is sometimes familiarly called a "pushbroom" system. A demonstrated alternative to vehicle-based data acquisition is a one-dimensional scanner system used from a fixed platform.

The deflection system of the streak tube is set to streak the electron beam completely down the phosphor screen in some specific time, called the "sweep time" of the tube. This also corresponds to the total range gate time (i. e., the total amount of time during which the system digitizes range data).

Ordinarily the sweep time is adjusted to fully display some interval of interest for exploring a particular region, as for instance some specific ocean depth from which useful beam return can be obtained—taking into account turbidity of the water. The starting point of the range gate is controlled by the trigger signal used to begin the sweep.

Computer control of both the sweep time and the sweep-start trigger provides the operator a flexible lidar system that can very rapidly change its range-gate size, its range-digitization starting point, and also its range-sampling resolution. This enables the system to search large areas of range with coarse range resolution, and then "zoom in" to obtain a high-resolution image around a discovered region of particular interest. For example, in one pulse the system could capture a range from 5 km to 7 km at low resolution, and then on the next laser pulse zoom in to 6 km±50 m and thereby image an object of prospective interest at the highest resolution.

Each column of CCD pixels corresponds to one channel of digitized range data, such as would be collected from a single time-resolved detector—for instance a photomultiplier tube (PMT) or an avalanche photodiode (APD). Each row is the slit image at a different time.

The size (in units of time) of the previously mentioned range bins is simply the sweep time divided by the number of pixels in the CCD columns. Such values are readily converted into distance units through multiplication by the speed of light in the relevant medium or media . . . .

[T]he invention as broadly conceived is directed to pulsed systems, without regard to whether pulses are time resolved by streaking subsystems or by other means; such other means may encompass for instance extremely fast electronics; or instead optical circuits, processors and memories that are nowadays being devised to replace electronics.

From Griffis:

[T]he present invention is a lidar system. [An exemplary aspect of t]he system includes some means for generating a measurement signal that is at least one-dimensional, corresponding to a received at-least-one-dimensional lidar-beam pulse. For purposes of breadth and generality in discussion of the invention, these means will be called simply the "generating means".

This . . . aspect of the invention also includes some means for time-resolving the measurement signal. Again for generality and breadth these means will be called the "resolving means". They include:

multiple memory elements for receiving and holding successive portions of the measurement signal respectively, some digital means for forming a digital sweep signal defining multiple digital states corresponding to the respective memory elements (the "forming means"), and some means for applying the digital sweep signal to control distribution of the successive measurement-signal portions into the respective memory elements (the "applying means").

Also part of this [exemplary] facet of the invention are some means for reading the measurement-signal portions from the memory elements. These means may be called the "reading means".

The foregoing may represent a description or definition of [this] aspect or facet of the invention in its broadest or most general form. Even as couched in these broad terms, however, it can be seen that this facet of the invention importantly advances the art.

In particular, use of a digital sweep is one key to particularly efficient, economical and cost-effective lidar systems that make use of commercial, off-the-shelf fast modern electronics. Such systems can replace the high-voltage, heavy, bulky and fragile streak tube in all applications but the most extremely demanding—in terms of range resolution . . . .

[Preferably] the forming means include a delay line that includes the memory elements. Here the delay line itself has clock signals serving as the digital sweep signal; and the delay line responds to the clock signals by successively advancing the received successive measurement-signal portions into the delay line . . . .

[D]irect connection from the resolving means of [some] aspect[s] of the invention to the memory elements will eliminate need for an intermediate isolating stage (such as passage through the optical domain as described above for the second main facet of the invention). This will make the overall system extremely efficient, compact and low in power consumption . . . .

[Preferably] the system includes some means for generating a measurement signal corresponding to a received lidar-beam pulse.

It also [preferably] includes a delay line that accepts successive portions of the measurement signal. The system also [preferably] includes some means, within the delay line, for advancing successively accepted signal portions farther into the delay line.

Also [preferably] included are some means for reading multiple measurement-signal portions substantially simultaneously from multiple positions along the delay line . . . .

A further group of preferences addresses the makeup of the time-resolving means. These may include—for handling successive segments of the electronic signal from each detector—a respective array of buffer amplifiers; together with a respective array of time-controlled switches connected to actuate the buffer amplifiers.

An additional preference in this case is that the system also include a respective array of programmable logic circuits generating time-base control signals to operate the switches. Alternatively the system preferably includes a respective array of delay lines generating time-base control signals to operate the switches.

Another preference is that the time-resolving means include—again for handling the electronic signal from each detector—a respective array of vertical-cavity surface-emitting lasers (VCSELs). The VCSELs sample successive segments of the electronic signal from each detector. A respective array of range-bin memory elements is connected to receive and integrate signal samples from the VCSELs . . . .

Figure 27:
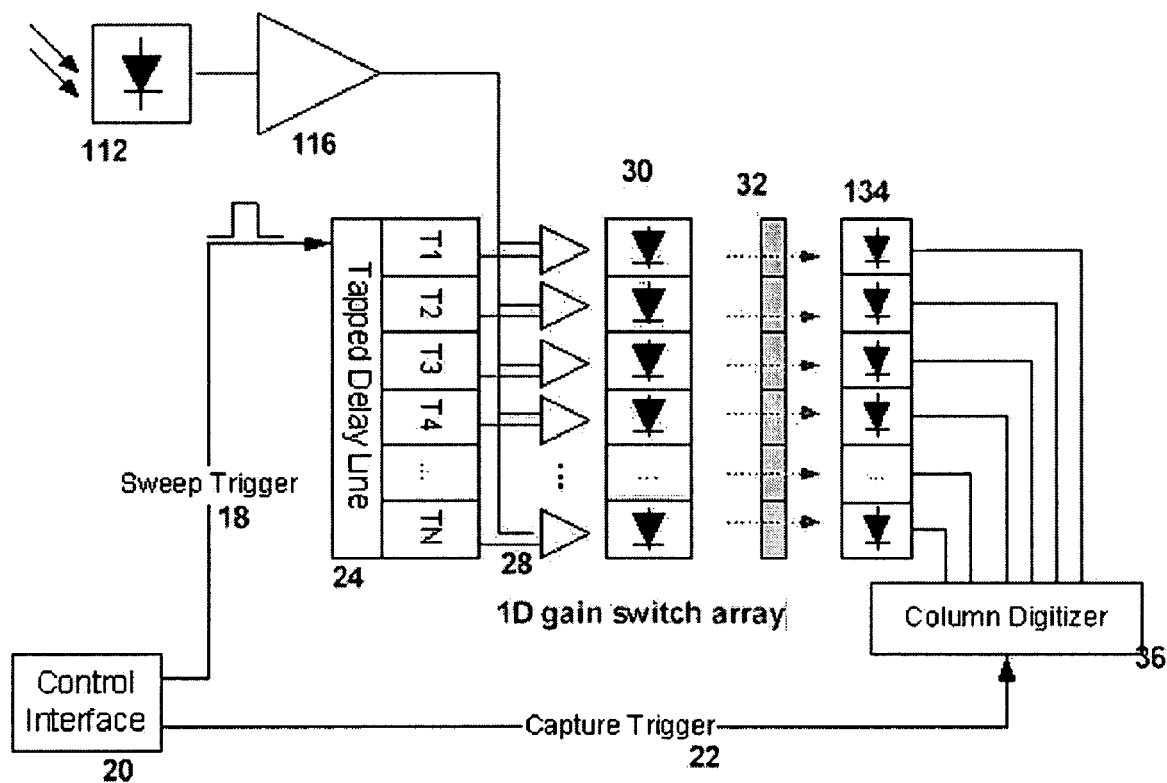
FIG. 27 (copied from FIG. 1 of the previously mentioned Griffis document) is a schematic view of a single-pixel receiver element according to a preferred embodiment of the invention that employs VCSEL converters following a time-resolution stage.

FIG. 27 (Griffis FIG. 1) is a [schematic] view of a single-pixel receiver element according to a preferred embodiment of the invention that employs VCSEL converters following a time-resolution stage . . . .

Details of one preferred embodiment according to the invention include:

1. a detection photodiode 112 (FIG. 1),
2. a transimpedance amplifier (TIA) 116,
3. a tapped delay line 24,
4. a vertical-cavity surface-emitting laser (VCSEL) 30, and
5. an image photodiode 12 . . . .

Tapped Delay Line

As noted earlier, the system requires some means for time-resolving the digital signal. In preferred embodiments of the invention a digital sweep is applied to control the distribution of successive signals 11.

Initially it was thought that a traditional analog tapped delay line 24 could be used to directly feed a VCSEL 30 array—with some help from so-called buffer "enables" (i. e., forward-transmission enabling terminals) and the like in the VCSEL drive circuit. Such configurations remain of interest for specific applications, as will occur to artisans skilled in this field.

Working with typical analog tapped delay lines 24, however, is relatively clumsy—as those devices tend to be tuned for very specific delays, and use passive/reactive circuit elements to provide delay. Active tapped delays, on the other hand, are much more focused on digital applications, and so have less utility for this necessarily hybrid system.

A preferred solution is to use programmable logic, in combination with analog switches, to realize the purpose of a tapped delay line 24. These switches are implied (FIG. 1) in terms of the "enables" associated with the buffers that drive the VCSEL elements. Instead of replicating the signal 11 across many outputs of a tapped delay line 24, however, a delayed version of a narrow control/gate pulse is generated across many outputs of a programmable logic device (e. g., field-programmable gate array FPGA) and used to gate the enables on the VCSEL drive buffers 50.

Using this approach makes use of standard logic designs and also enables the use of traditional semiconductor switch technology that can be implemented as a gain enable, precluding the need for relatively exotic analog tapped delay lines.

Because noise statistics are already set by front-end electronics (cascade amplifier noise figures are dominated by the noise figure of the first gain stage), the principal concern with the tapped delay line 24 and associated switches 26 is the switch rise-and-fall time. Good analog switches, such as the SN74LVC2G66 by TI, have nanosecond-class rise-and-fall times.

That TI unit, for instance, has switching times in the range of 1 to 5 ns, depending on drive voltage and rail voltage for the part. This has the effect of limiting the temporal sampling and overall bandwidth of the receiver as well. If for example the switch temporal behavior is treated as a Gaussian with 5 ns width, the equivalent bandwidth will be approximately 73 MHZ.

In another preferred embodiment, the delay line 24 has clock signals serving in lieu of a digital sweep signal. The delay line 24 responds to the clock signals by successively advancing the successively received signals into and along the delay line itself.

In other preferred embodiments dynamic RAM 88 or another capacitive array receives the successive measurement signals distributed by clock signals. Additionally, some preferred embodiments include use of a shift register as the delay line wherein the memory elements take on successive positions within the shift register and the multiple signals 11 are read substantially simultaneously using parallel circuits.

In accompanying apparatus claims generally the term "such" is used (instead of "said" or "the") in the bodies of the claims, when reciting elements of the claimed invention, for referring back to features which are introduced in preamble as part of the context or environment of the claimed invention. The purpose of this convention is to aid in more distinctly and emphatically pointing out which features are elements of the claimed invention, and which are parts of its context—and thereby to more particularly claim the invention.

It will be understood that the foregoing disclosure is intended to be merely exemplary, and not to limit the scope of the invention—which is to be determined by reference to the appended claims.

What is claimed is:

1. A system for use with one or more features to be detected and ranged; said system comprising:
    a lidar-beam source;
    at least one transceiver for directing the beam to, and collecting light reflected from, such one or more features;
    disposed wholly within an optical system of the transceiver, optical deflectors selectively addressing the generated beam to such one or more features; and
    a lidar detector for time-resolving the reflected beam; wherein:
    in passing light bidirectionally to and from a particular point of such one or more features, the transceiver passes light through substantially a single corresponding common point of the transceiver; and
    the lidar detector comprises means for time-resolving the reflected beam by distributing successive signals along a nontemporal domain.

2. The system of claim 1, wherein:
    the nontemporal domain comprises a streak-tube screen.

3. A system for use with one or more features to be detected and ranged; said system comprising:
    a lidar light-beam source;
    at least one transceiver for directing a lidar beam from the source to, and collecting the beam reflected from, such one or more features;
    a lidar detector for time-resolving the reflected beam; and
    means for steering successive time segments of the beam to and from particular points, selectively, of such one or more features; said means being chosen from the group consisting of:
    at least one micromechanical mirror; and
    at least one optical-switching fabric.

4. The system of claim 3, wherein:
    the lidar detector comprises means for time-resolving the reflected beam by distributing successive signals along a nontemporal domain.

5. The system of claim 4, wherein:
    the nontemporal domain comprises a streak-tube screen.

6. The system of claim 3, wherein:
    the at least one transceiver comprises plural transceivers; and
    the steering means comprise means for successively selecting different ones of the transceivers.

* * * * *